(12) United States Patent
Christensen

(10) Patent No.: US 11,094,015 B2
(45) Date of Patent: Aug. 17, 2021

(54) DATA ACCESS AND PROCESSING SYSTEM

(71) Applicant: BMLL TECHNOLOGIES, LTD., London (GB)

(72) Inventor: Hugh L. Christensen, London (GB)

(73) Assignee: BMLL TECHNOLOGIES, LTD., London (GB)

( * ) Notice: Subject to any disclaimer, the term of this patent is extended or adjusted under 35 U.S.C. 154(b) by 880 days.

(21) Appl. No.: 14/709,151

(22) Filed: May 11, 2015

(65) Prior Publication Data

US 2020/0090278 A1 Mar. 19, 2020

Related U.S. Application Data

(60) Provisional application No. 62/023,639, filed on Jul. 11, 2014.

(51) Int. Cl.
*G06Q 40/00* (2012.01)
*G06Q 40/06* (2012.01)
*G06Q 40/04* (2012.01)
*G06N 20/00* (2019.01)

(52) U.S. Cl.
CPC ............ *G06Q 40/06* (2013.01); *G06N 20/00* (2019.01); *G06Q 40/04* (2013.01)

(58) Field of Classification Search
CPC ........ G06Q 40/06; G06Q 40/04; G06Q 40/00; G06Q 40/02; G06Q 40/08; G06Q 30/0201

See application file for complete search history.

(56) References Cited

U.S. PATENT DOCUMENTS

| 3,588,823 | A | 6/1971 | Chappadua et al. |
| 5,226,019 | A | 7/1993 | Bahorich |
| 5,289,354 | A | 2/1994 | Clayer et al. |
| 5,717,589 | A | 2/1998 | Thompson et al. |

(Continued)

FOREIGN PATENT DOCUMENTS

| CA | 2800297 C | 12/2011 |
| CA | 2844667 C | 2/2013 |

(Continued)

OTHER PUBLICATIONS

Author: S. Kullback et al., Title: "On Information and Sufficiency" Publication: Annals of Mathematical Statistics, vol. 22, No. 1, pp. 79-86 Publication Date: Mar. 1951.

(Continued)

*Primary Examiner* — Mike Anderson
(74) *Attorney, Agent, or Firm* — Sheppard, Mullin, Richter & Hampton LLP

(57) ABSTRACT

This invention provides a distributed data analysis system for use in analysing Limit Order Book (LOB) data. The system include a virtual machine interface module for creating at least one virtual machine. Each virtual machine is configured to create at least one compute unit for processing the LOB data. Each compute unit and the LOB data is collocated. The system includes an update module for updating the LOB data from at least one electronic trading venue. A monitoring module for tracking the activity of at least one user on the system is also provided. A software library module having at least one algorithm for processing and/or analysing the LOB data, is also provided. The system is implemented in a cloud computing environment.

27 Claims, 12 Drawing Sheets

(56) References Cited

U.S. PATENT DOCUMENTS

| | | | |
|---|---|---|---|
| 5,819,247 A | 10/1998 | Freund et al. | |
| 5,841,735 A | 11/1998 | Quazi | |
| 6,208,991 B1* | 3/2001 | French | G06F 17/30067 |
| 6,253,162 B1 | 6/2001 | Jarman et al. | |
| 6,718,312 B1 | 4/2004 | McAfee et al. | |
| 7,231,399 B1 | 6/2007 | Bem et al. | |
| 7,496,543 B1 | 2/2009 | Bamford et al. | |
| 7,599,876 B1 | 10/2009 | Lo et al. | |
| 7,690,991 B2 | 4/2010 | Black | |
| 7,716,198 B2 | 5/2010 | Meyerzon et al. | |
| 7,860,687 B2 | 12/2010 | Vigoda et al. | |
| 7,882,014 B2 | 2/2011 | Shapiro et al. | |
| 7,933,828 B2* | 4/2011 | Bandman | G06Q 30/08 705/35 |
| 7,970,713 B1 | 6/2011 | Gorelik et al. | |
| 8,069,110 B2 | 11/2011 | Cottrell | |
| 8,095,662 B1 | 1/2012 | Lappas et al. | |
| 8,185,467 B2 | 5/2012 | Friesen et al. | |
| 8,200,610 B1 | 6/2012 | Birch et al. | |
| 8,239,778 B2 | 8/2012 | Sheth-Voss et al. | |
| 8,266,290 B2 | 9/2012 | Calder et al. | |
| 8,326,750 B1 | 12/2012 | Wang | |
| 8,364,612 B2 | 1/2013 | Van Gael et al. | |
| 8,370,241 B1 | 2/2013 | Cotton | |
| 8,433,660 B2 | 4/2013 | Stern et al. | |
| 8,442,890 B2 | 5/2013 | Brumfield et al. | |
| 8,478,790 B2 | 7/2013 | Annapragada | |
| 8,510,835 B1 | 8/2013 | Bucu et al. | |
| 8,516,137 B2 | 8/2013 | Calder et al. | |
| 8,560,477 B1 | 10/2013 | Petrov et al. | |
| 8,571,967 B1 | 10/2013 | Silverman | |
| 8,601,583 B1 | 12/2013 | Chandrasekhar et al. | |
| 8,612,368 B2 | 12/2013 | Burdick et al. | |
| 8,645,307 B2 | 2/2014 | Kim et al. | |
| 8,694,469 B2 | 4/2014 | Parab | |
| 2003/0028469 A1 | 2/2003 | Bergman et al. | |
| 2004/0083217 A1 | 4/2004 | Brackett et al. | |
| 2004/0205015 A1 | 10/2004 | DeLaCruz | |
| 2005/0021317 A1 | 1/2005 | Weng et al. | |
| 2006/0173764 A1* | 8/2006 | Costakis | G06Q 20/10 705/35 |
| 2007/0038543 A1* | 2/2007 | Weinstein | G06Q 20/027 705/36 R |
| 2007/0294162 A1* | 12/2007 | Borkovec | G06Q 40/00 705/37 |
| 2008/0243572 A1 | 10/2008 | Amos | |
| 2009/0276771 A1* | 11/2009 | Nickolov | G06F 9/4856 717/177 |
| 2011/0066567 A1 | 3/2011 | Acuna-Rohter et al. | |
| 2011/0282782 A1* | 11/2011 | Kumar | G06F 17/30867 705/39 |
| 2011/0302583 A1 | 12/2011 | Abadi et al. | |
| 2012/0072333 A1 | 1/2012 | Yanase et al. | |
| 2012/0016816 A1 | 3/2012 | Bandman et al. | |
| 2013/0194271 A1 | 8/2013 | Roesch et al. | |
| 2013/0257873 A1 | 10/2013 | Isozaki | |
| 2013/0275068 A1 | 10/2013 | Hidai et al. | |
| 2013/0282631 A1 | 10/2013 | Zaman et al. | |
| 2013/0290223 A1 | 10/2013 | Chapelle et al. | |
| 2014/0033125 A1 | 1/2014 | Merel | |
| 2014/0059162 A1 | 2/2014 | Herbrich et al. | |
| 2014/0059163 A1 | 2/2014 | Herbrich et al. | |
| 2014/0101255 A1 | 4/2014 | Pal et al. | |
| 2014/0149273 A1* | 5/2014 | Angell | G06Q 40/04 705/37 |
| 2014/0195444 A1 | 7/2014 | Bernard | |
| 2014/0244836 A1 | 8/2014 | Goel et al. | |
| 2015/0081505 A1* | 3/2015 | Co | G06Q 40/04 705/37 |
| 2015/0095207 A1* | 4/2015 | Kodde | G06Q 40/04 705/37 |
| 2015/0154646 A1 | 6/2015 | Mishra et al. | |
| 2015/0227897 A1 | 8/2015 | Loera | |
| 2015/0278703 A1 | 10/2015 | Liu | |
| 2016/0267509 A1 | 9/2016 | Grosso | |
| 2017/0039650 A1* | 2/2017 | Khan | G06Q 40/06 |
| 2017/0344920 A1 | 11/2017 | Shenoy et al. | |
| 2019/0236627 A1 | 8/2019 | Christensen | |
| 2020/0167326 A1 | 5/2020 | Christensen | |

FOREIGN PATENT DOCUMENTS

| | | |
|---|---|---|
| CN | 106355447 A | 1/2017 |
| CN | 109345301 A | 2/2019 |
| WO | WO 2011/152900 A2 | 12/2011 |
| WO | WO 2012/115958 A2 | 8/2012 |
| WO | WO 2012/135319 A1 | 10/2012 |
| WO | WO 2013/145779 A2 | 10/2013 |

OTHER PUBLICATIONS

Author: N. G. Kingsbury et al., Title: "Digital filtering using logarithmic arithmetic" Publication: Electronics Letters, vol. 7, Issue 2, pp. 56-58, Publication Date: Jan. 28, 1971, Publisher: Institution of Engineering and Technology.

Author: Peter S. Maybeck, Title: "Stochastic models, estimation, and control" vol. 1, Publication Date: 1979, Publisher: Academic Press, Inc.

Author: Shun-Ichi Aware, Title: "Differential-Geometrical Methods in Statistics" Publication Date: 1985, Publisher: Springer-Verlag.

Author: Satnam Alag et al., Title: "Inference using message propagation . . ." Publication: Proceedings of the Twelfth international conference on Uncertainty in artificial intelligence, pp. 20-27, Publication Date: Aug. 1996.

Author: A. P. Dempster et al., Title: "Maximum Likelihood from Incomplete Data via the EM Algorithm," Publication: Journal of the Royal Statistical Society. Series B, vol. 39, No. 1, pp. 1-38, Publication Date: 1977.

Author: Srinhvas M. Aji et al., Title: "A general algorithm for distributing information . . . ," Publication: IEEE International Symposium on Information Theory, p. 6, Publication Date: Jun. 29-Jul. 4, 1997, Publisher: IEEE.

Author: Boris V. Cherkassky et al., Title: "Negative-cycle detection algorithms," Publication: Mathematical Programming, vol. 85, pp. 277-311 Publication Date: Jun. 1999, Publisher: Springer-Verlag.

Author: Kevin Murphy et al., Title: "Loopy Belief Propagation for Approximate Inference . . . ," Publication: Proceedings of the Fifteenth Conference on Uncertainty in A.I., pp. 467-475, Publication Date: Jul. 1999.

Author: Michael I. Jordan et al., Title: "An introduction to Variational Methods for Graphical Models," Publication: Machine Learning, vol. 37, pp. 183-233 Publication Date: Nov. 1999, Publisher: Kluwer Academic Publishers.

Author: Dipak K. Dey et al., Title: "Generalized Linear Models—A Bayesian perspective," Publication Date: May 25, 2000, Publisher: CRC Press.

Author: Thomas P. Minka, Title: "A family of algorithms for approximate Bayesian inference," Publication Date: Jan. 2001, Publisher: Massachusetts Institute of Technology.

Author: Frank R. Kschischang et al., Title: "Factor Graphs and the Sum-Product Algorithm," Publication: IEEE Transactions on Information Theory, vol. 47, Issue 2, pp. 498-519, Publication Date: Feb. 2001, Publisher: IEEE.

Author: Kevin P. Muphy, Title: "An Introduction to Graphical Models" Date: May 10, 2001.

Author: John Lafferty et al., Title: "Conditional Random Fields: Probabilistic Models . . . ," Publication: Proceedings of the Eighteenth International Conference on Machine Learning, pp. 282-289, Publication Date: Jun. 2001.

Author: Thomas P. Minka, Title: "Expectation propagation for approximate Bayesian inference," Publication: Seventeenth conference on Uncertainty in artificial intelligence, pp. 362-369, Publication Date: Aug. 2001.

Author: Yair Weiss et al., Title: "Correctness of Belief Propagation in Gaussian Graphical Models of . . . ," Publication: Neural Computation, vol. 13, Issue 10, pp. 2173-2200, Publication Date: Oct. 2001, Publisher: MIT Press.

(56) References Cited

OTHER PUBLICATIONS

Author: Annete J. Dobson, Title: "An introduction to generalized linear models—Second Edition," Publication Date: 2002, Publisher: Chapman & Hall/CRC.

Author: Brendan J. Frey, Title: "Extending Factor Graphs so as to Unify Directed and Undirected Graphical Models," Publication: Proceedings of the Nineteenth Conference on Uncertainty in Artificial Intelligence, pp. 257-264, Publication Date: Aug. 2002.

Author: Michael Kearns et al., Title: "Machine Learning for Market Microstructure . . ." Publication: High Frequency Trading—New Realities for Traders, Markets and Regulators, Publication Date: 2003, Publisher: Risk Books.

Author: Robert F. Almgren, Title: "Optimal execution with nonlinear impact functions and trading-enhanced risk," Publication: Applied Mathematical Finance, vol. 10, Issue 1, pp. 1-18, Publication Date: 2003.

Author: Isabelle Guyon et al., Title: "An Introduction to Variable and Feature Selection," Publication: The Journal of Machine Learning Research, vol. 3., pp. 1157-1182, Publication Date: Mar. 2003.

Author: David H. Stern et al., Title: "Modelling Uncertainty in the Game of Go," Publication: "https://www.microsoft.com/en-us/research/publication/modelling-uncertainty-in-the-game-of-go/", Publication Date: Jan. 2004.

Author: Iain Murray et al., Title: "Bayesian learning in undirected graphical models . . ." Publication: Proceedings of the 20th conference on Uncertainty in artificial intelligence, pp. 392-399, Publication Date: Jul. 2004.

Author: Thomas Minka, Title: "Divergence measures and message passing" Publication: "https://www.microsoft.com/en-us/research/publication/divergence-measures-and-message-passing/" Publication Date: Jan. 2005.

Author: Shivani Agarwal et al., Title: "Proceedings of the Tenth international Workshop on Artificial Intelligence . . . ," Publication Date: Jan. 6-8, 2005, Publisher: The Society for Artificial Intelligence and Statistics.

Author: John Winn et al., Title: "Variational Message Passing" Publication: The Journal of Machine Learning Research, vol. 6, pp. 661-694 Publication Date: Apr. 2005.

Author: Justin Dauwels et al., Title: "Expectation maximization as message passing," Publication: IEEE International Symposium on Information Theory Publication Date: Sep. 4-9, 2005, Publisher: IEEE.

Author: Christopher M. Bishop, Title: "Pattern Recognition and Machine Learning" Publication Date: 2006, Publisher: Springer.

Author: Sridevi Parise et al., Title: "Structure Learning in Markov Random Fields" Publication Date: 2006.

Author: David Stern et al., Title: "Bayesian pattern ranking for move prediction in the game of Go," Publication: Proceedings of the 23rd international conference on Machine learning, pp. 873-880, Publication Date: Jun. 2006.

Author: Gal Elidan et al., Title: "Residual belief Propagation . . . ," Publication: Proceedings of the Twenty-Second Conference on Uncertainty in Artificial Intelligence, pp. 165-173, Publication Date: Jul. 2006.

Author: Justin Dauwels et al., Title: "Particle Methods as Message Passing" Publication: IEEE International Symposium on Information Theory, Publication Date: Jul. 9-14, 2006, Publisher: IEEE.

Author: Hans-Andrea Loeliger et al., Title: "The Factor Graph Approach to Model-Based Signal Processing," Publication: Proceedings of the IEEE, vol. 95, No. 6, pp. 1295-1322, Publication Date: Jun. 2007, Publisher: IEEE.

Author: Charles Sutton et al., Title: "Improved dynamic schedules for belief propagation," Publication: Proceedings of the Twenty-Third Conference on Uncertainty in Artificial Intelligence, pp. 376-383, Publication Date: Jul. 2007.

Author: Karel Janecek et al., Title: "Matching Algorithms of International Exchanges" Publication Date: Dec. 1, 2007.

Author: Xingdong Wu et al., Title: "Top 10 algorithms in data mining," Publication: Knowledge and Information Systems, vol. 14, pp. 1-37 Publication Date: Dec. 4, 2007.

Author: Martin J. Wainwright et al., Title: "Graphical Models, Exponential Families, and Variational Inference," Publication: Foundations and Trends in Machine Learning, vol. 1, No. 1-2, pp. 1-305, Publication Date: Jan. 2008.

Author: Trevor Hastie et al., Title: "The Elements of Statistical Learning—Second Edition" Publication Date: Feb. 2009, Publisher: Springer.

Author: Joseph E. Gonzalez et al., Title: "Distributed parallel inference on large factor graphs," Publication: Proceedings of the Twenty-Fifth Conference on Uncertainty in Artificial Intelligence, pp. 203-212, Publication Date: Jun. 2009.

Author: Daphne Koller et al., Title: "Probabilistic Graphical Models—Principles and Techniques," Publication Date: Jul. 2009, Publisher: The MIT Press.

Author: Financial Services Authority, Title: "Markets Division: Newsletter on Trade Publication Issues," Publication: Market Watch, Issue No. 33, Publication Date: Aug. 2009, Publisher: Financial Services Authority.

Author: Brendan J. Frey et al., Title: "A Comparison of Algorithms for Inference and Learning in Probabilistic Graphical Models," Publication: IEEE Transactions on Pattern Analysis and Machine Intelligence, vol. 9, pp. 1392-1416.

Author: David Easley et al., Title: "The Microstructure of the 'Flash Crash'. . . ," Publication: The Journal of Portfolio Management, vol. 37, No. 2, pp. 118-128 Publication Date: Winter 2011.

Author: Anna Goldenberg et al., Title: "A Survey of Statistical Network Models" Publication: Foundations and Trends in Machine Learning, vol. 2, Issue 2, pp. 129-233, Date: Dec. 2009.

Author: Rama Cont et al., Title: "A Stochastic Model for Order Book Dynamics," Publication: Operations Research, vol. 58, No. 3, pp. 549-563 Publication Date: May 2010.

Author: Grzegorz Malewicz et al., Title: "Pregel: A System for Large-Scale Graph Processing," Publication: Proceedings of the 2010 ACM SIGMOD International Conference on Management of data, pp. 135-146, Publication Date: Jun. 2010.

Author: Matei Zaharia et al., Title: "Spark: Cluster Computing with Working Sets" Publication Date: Jun. 22, 2010, Publisher: Department of Computer Science—University of California at Berkeley.

Author: Tom White, Title: "Hadoop—The Definitive Guide: Second Edition" Publication Date: Oct. 2010, Publisher: O'Reilly Media, Inc.

Author: Ron Bekkerman et al., Title: "Scaling up Machine Learning" Publication Date: 2011, Publisher: Cambridge University Press.

Author: Veselin Stoyanov et al., Title: "Empirical Risk Minimization of Graphical Model Parameters . . . ," Publication: Proceedings of Machine Learning Research, vol. 15, pp. 725-733, Publication Date: Apr. 2011.

Author: Alexander Schwing et al., Title: "Distributed message passing for large scale graphical models," Publication: Conference on Computer Vision and Pattern Recognition, vol. 1, pp. 1358-1366, Publication Date: Jun. 20-25, 2011, Publisher: IEEE.

Author: Gao Feng Gu et al., Title: "The position profiles of order cancellations in an emerging stock market," Publication: The Journal of Statistical Mechanics: Theory and Experiment, Publication Date: Dec. 28, 2011.

Author: Timothy Hunter et al., Title: "Large-Scale Online Expectation Maximization with Spark Streaming," Publication Date: 2012, Publisher: Department of Computer Science—University of California at Berkeley.

Author: Victoria Martin et al., Title: "Local stability of Belief Propagation algorithm with multiple fixed points," Publication: STAIRS 2012: Proceedings of the Sixth Starting AI Researchers' Symposium, pp. 180-191.

Author: Katharina Morik et al., Title: "Parallel Inference on Structured Data with CRFs on GPUs," Publication: International Workshop at ECML PKDD on Collective Learning and Inference on Structured Data, Publication Date: Feb. 21, 2012.

Author: Yucheng Low et al., Title: "Distributed GraphLab: a framework for machine learning and data mining in the cloud," Publication: Proceedings of the VLDB Endowment, pp. 716-727, Publication Date: Apr. 2012.

(56) References Cited

OTHER PUBLICATIONS

Author: Kevin P. Murphy, Title: "Machine Learning: A Probabilistic Perspective" Publication Date: Aug. 2012, Publisher: The MIT Press.

Author: Joseph E. Gonzalez, Title: "PowerGraph: distributed graph-parallel computation on natural graphs," Publication: Proceedings of the 10th USENIX conference on Operating Systems Design and Implementation, pp. 17-30 Publication Date: Oct. 2012.

Author: Eunho Yang et al., Title: "Graphical models via generalized linear models" Publication: Proceedings of the 25th International Conference on Neural Information Processing Systems, vol. 1, pp. 1358-1366, Publication Date: Dec. 2012.

Author: Tim Kraska et al., Title: "MLbase: A Distributed Machine-learning System," Publication: Sixth Biennial Conference on Innovative Data Systems Research Publication Date: Jan. 6-9, 2013.

Author: Martin D. Gould et al, Title: "Limit order books" Publication: Quantitative Finance, vol. 13. No. 11, pp. 1709-1742 Publication Date: Apr. 26, 2013, Publisher: Routledge, a Taylor & Francis Group.

Author: Hugh L. Christensen et al., Title: "Prediction of Hidden Liquidity in the Limit Order Book of GLOBEX Futures" Publication: The Journal of Trading pp. 68-95, Publication Date: Summer 2013.

Author: Reynold S. Xin et al., Title: "GraphX: a resilient distributed graph system on Spark," Publication: First International Workshop on Graph Data Management Experiences and Systems, pp. 1-6, Publication Date: Jun. 2013.

Author: Orna Agmon Ben-Yehuda et al., Title: "Deconstructing Amazon EC2 Spot Instance Pricing," Publication: ACM Transactions on Economics and Computation, vol. 1, Issue 3, Article 16, Publication Date: Sep. 2013.

Author: Tarun Chordia et al. / Editorial Board, Title: "High-frequency trading" Publication: Journal of Financial Markets, vol. 16, Issue 4, pp. 637-645 Publication Date: Nov. 2013, Publisher: Elsevier.

Author: Hugh L. Christensen et al., Title: "Rebuilding the limit order book . . . ," Publication: Quantitative Finance, vol. 13, No. 11, pp. 1779-1799, Publication Date: Nov. 1, 2013, Publisher: Routledge, a Taylor & Francis Group.

Author: Gregory Laughlin et al., Title: "Information Transmission Between Financial Markets . . . ," Publication: Financial Review, vol. 49, Issue 2, pp. 283-312, Publication Date: Apr. 7, 2014.

Author: Adam D. Clark-Joseph, Title: "Exploratory Trading" Date: Dec. 31, 2014.

Author: Yuncheng Shen et al., Title: "A pricing model for big personal data" Publication: Tsinghua Science and Technology, vol. 21, Issue 5, pp. 482-490, Publication Date: Oct. 18, 2016, Publisher: Tsinghua University Press.

* cited by examiner

DATA ACCESS AND PROCESSING SYSTEM

FIELD OF THE INVENTION

This invention generally relates to a data storage and processing system for carrying out research on data from securities markets. More particularly, the present invention is directed to a data storage and processing system and method to allow distinct users to carry out statistical analysis on large quantities of LOB data on a cloud computing platform.

BACKGROUND OF THE INVENTION

In this section we introduce the background of the invention and place it in the context of the prior art. LOBs exist to match buyers and sellers in electronic securities markets (Gould et al., 2013). This market structure is common to many different types of security, for example futures, options, equities and spot FX. The LOB is the accumulation of all unexecuted limit orders from buyers and sellers in a market place and thus it acts as a store of traders future intentions. Each limit order in the LOB has at least three properties associated with it; the limit price at which the order can be executed, the side of the book—buy or sell and size of the order in number of units of the security. Limit orders arrive into the LOB in a sequential manner, each with a known time stamp. The LOB data is public information which is broadcast by the trading venue. Together with the trades (limit orders which have been matched by the exchange matching algorithm), this disseminated information comprises the market data feed. This market data feed can be recorded by the trading venue, or other market participants listening to the feed. While low-frequency financial data has been available since the 1970's, the ability to access recorded LOB data from the trading venues is a relatively recent occurrence, for example for CME in 2008, Eurex—in 2010 and NYSE Liffe in 2011. Other leading exchanges, such as ICE and KRX do not yet have an historical LOB data product. The reason for the relative lack of access to LOB data is that the data is complex to deal with and large in size, meaning it is hard to analyze and store. For example, a single day's broadcast data for a single security may comprise of 15 million messages, each with hundreds of fields of information resulting in a data file approximately 5 GB in size. LOB data for most liquid securities globally, for three years, has a total size of approximately 10 PB, equivalent to a month's worth of Facebook data or 16 million compact discs.

High-frequency trading (HFT) is the rapid buying and selling of securities defined by only holding the security for a short amount of time. HFT is an activity carried out by algorithms run on computers. As of 2014 it is estimated that these algorithms comprise the significant part of the global financial markets traded volume (Chordia et al., 2013). The design and construction of these algorithms is carried out using recorded financial data to look for prior patterns that can be exploited in the future. The optimal data to use for this process is the LOB data set as it holds the maximal information. Other classes of market participant can also benefit from using the LOB data set. Low-frequency traders, such as mutual funds, often need to place and execute large orders. They can use LOB data to design methods for minimizing their market impact. Financial regulators are required to monitor and understand the action of all market participants, including those involved in HFT. In order to do this, regulators need to be able to access and analyze the LOB data set.

LOB data can be applied to help solve a range of financial problems. For example, derivatives contracts on the NYSE Liffe exchange have orders from the LOB matched by use of the exchange matching algorithm (U.S. Pat. No. 8,069,110). By using historical LOB data, participants can design ways of optimally participating in the bargain striking process (Janecek & Kabrhel, 2007). In a second example, LOB data can be used to detect a special type of order called an iceberg order. This order type allows a participant to hide the true size of their order, preventing market impact. By using historical LOB data, participants can accurately determine the true liquidity state of the market (Christensen & Woodmansey, 2013). In a third example, LOB data can be used to infer further information on the market microstructure by estimating the size of all the orders in a market (Christensen et al., 2013). In a fourth example, LOB data can be used to design algorithms that can generate implied orders. An implied order is a type of order inserted into the LOB by the trading venue itself, as a result of no-arbitrage arguments (U.S. Ser. No. 12/559,215; CA 2800297). By being able to generate implied orders, a participant maybe able to design profitable trading strategies.

Electronic trading occurs on a multitude of global venues. Each venue broadcasts its own data feed. Each venue may make this data available historically to venue participants and other parties. As each trading venue has its own proprietary software, there is no common data format for the broadcast data. Companies such as Bloomberg (www.bloomberg.com) and Thomson Reuters (http://thomsonreuters.com) have specialized in offering a collation service for data from many different venues, processing this data into a common format, cleaning the data and allowing users to connect to their platform and access, but not own, the data (CA 2844867 A1; PCT/US2012/025930; U.S. Pat. No. 8,185,467). What such companies are not able to offer is long-run histories of full LOB data due to the computational challenges of storing, distributing and formatting the LOB data. Previous patents have considered the challenges of processing data, for example U.S. Ser. No. 13/032,516. Other patents have considered how to visually represent market data resulting from electronic markets, for example U.S. Pat. No. 8,442,890.

Cloud computing refers to the use of computer hardware located in the internet. Leading cloud computing platforms include Amazon Web Services (AWS) http://aws.amazon.com, Google Cloud https://cloud.google.com and Microsoft Azure http://azure.microsoftcom. Cloud computing platforms commonly include mechanisms for secure known user access, date storage, virtual machine (VM) units and computation. VMs are software-based emulations of a computer, which maybe located in the cloud, can be generated on demand and securely connected to by remote access software (U.S. Pat. Nos. 8,601,583; 8,095,862). Key reasons to use cloud computing for big data are the ability to co-locate data storage and compute nodes and also the ability to dynamically scale these facilities as needed (U.S. Pat. No. 8,478,790). Co-location is important when dealing with large amounts of data, as it is the movement of the data to the compute nodes that can be the bottle-neck when the data is remotely located. The security of data and processes is an important aspect of cloud computing and has been considered in various previous patents, for example (U.S. Pat. No. 8,510,835). Cloud computing allows storage of data at huge scale with a high-degree of fault tolerance in an economically viable way (U.S. Pat. Nos. 8,516,137; 8,266,290). Cloud computing also allows for disaster recovery solutions to be incorporated as a integral part of any cloud platform use (U.S. Ser. No. 12/895,835). The application of cloud computing to big data problems requires software which is able to interact with the architecture in the required manner. Commonly used open source software for this problem includes Hadoop (White, 2009) and Spark (Zaharia et al., 2012; Zaharia et al., 2010).

Machine learning is a branch of computer science which deals with how systems can learn from data (Bishop, 2006). The application of machine learning techniques to large financial data sets is a rapidly growing area of interest (Kearns & Nevmyvaka, 2013). Parallelization is a software technique used when applying machine learning to large data sets, when computation time needs to be minimized. Parallelization breaks a problem down into small parts and then solves simultaneously, allowing for a quicker solution. The parallelization of machine learning algorithms is both an area of current academic research and also of patent activity (U.S. Pat. No. 8,612,368).

When the data required to be analyzed by machine learning algorithms is large in size, the process needs to distributed across many computers (U.S. Ser. No. 13/458, 545; U.S. Pat. No. 8,200,810). This requires software that aligns with the distributed hardware architecture. Yanase et al have patented a method to carry out distributed machine learning using parallelized algorithms (U.S. Ser. No. 13/176, 809). The application of machine learning as a patented technique for testing hypotheses and pattern recognition is not new, for example U.S. Pat. Nos. 5,819,247, 5,946,675. Patents have also been granted for the application of machine learning to financial software, for example Wang et al have patented a method of financial analysis using objected oriented programming (U.S. Pat. No. 8,326,750). Bayesian mathematics is a distinct branch of statistics which is based on applying Bayes rule (Bishop, 2006). Bayesian mathematics is the basis of all machine learning. Bayesian mathematics is particularly suited to problems where there are large amounts of sequential data and information about the system under consideration is known in advance. Hidai et al patented a system to obtain time series data and carry out Bayesian learning and inference using a hidden Markov model (U.S. Ser. No. 13/912,836, PCT/JP2013/002182). Lo et al patented an automated way of inserting orders into the LOB using Bayesian mathematics (U.S. Pat. No. 7,599,876).

Probabilistic graphical models (PGMs) are a type of Bayesian model (Goldenberg et al., 2010). PGMs applied to financial problems have been previously patented, for example Cotton applies a PGM to a network of prices from collateralized debt obligations securities (U.S. Pat. No. 8,370,241). In another PGM patent, Isozaki et al have addressed issues relating to cause and effect relationships in networks (U.S. Ser. No. 13/845,626). Kim et al patented a technique for generating a PGM structure based on streaming data (U.S. Pat. No. 8,645,307). Petrov et al patented an approach for semi-supervised learning of speech models (U.S. Pat. No. 8,560,477). One of the advantages to PGMs is that they allow easy visualization of complex problems, for example probabilities associated with time series (U.S. Ser. No. 13/361,416). Sheth et al have patented a method to map between a data store and a graphical model (U.S. Pat. No. 8,239,778). Factor graphs are a type of PGM that are especially suitable for large data problems. Van Gael et al have patented a method to probabilistically relate factor graphs to databases (U.S. Pat. No. 8,364,812). Often the quantities of data that wish to be exploited using a factor graph are more than a single computer can handle. Vigoda has patented a method for applying factor graphs to a distributed network of computers (PCT/US2011/025743). Vigoda et al has also patented a method for applying factor graph algorithms, such as belief propagation, to analog time series information (U.S. Pat. No. 7,860,687). Zaman et al have patented a method of predicting the propagation of messages around a factor graph, in the context of a social network (U.S. Ser. No. 13/919,088). Herbrich et al consider the problem synchronization when updating the model parameters of a PGM on a distributed architecture (U.S. Ser. No. 13/594,885; U.S. Ser. No. 13/594,890). Stern et al consider the problem of message passing In a factor graph in the context of managing a portfolio of experts (U.S. Pat. No. 8,433,660).

OBJECTS AND SUMMARY OF THE PRESENT INVENTION

This Summary Is provided to introduce a selection of concepts in a simplified form that are further described below in the Detailed Description. This Summary is not intended to identify key factors or essential features of the claimed subject matter, nor is it intended to be used to limit the scope of the claimed subject matter.

It is an object of this invention to provide, by means of a software system, the ability for users to carry out analysis on LOB data on a cloud computing platform.

It is an further object of this invention to provide a set of algorithms that will carry out processing of LOB data in a parallelized and distributed manner.

It is an object of this invention to provide a set of algorithms that will allow representation of the LOB data set as a factorized graph and facilitate learning and inference on that model.

It is an object of this invention to provide a set of machine learning algorithms that are specifically adapted to the LOB data set.

The above and other objects of the present invention are realized in a cloud hosted, programmed controlled platform and system for research into LOB data. The platform and system is summarized in FIG. 1. The inventive system may apply machine learning algorithms to processed LOB data in order to carry out pattern recognition. The system can recognizes patterns which occur intra LOB and inter LOB. This is accomplished by use of a multi-module analysis system, wherein individual modules exist in order to facilitate different steps of the research process.

In one embodiment, the system utilizes software modules to influence,

1. Secure connection by multiple users to the cloud based platform.

2. The ability to control which LOB data a user is able to access and/or download.

3. The ability to track, log and bill users for data and computational resources used, also allowing for independent auditing.

4. The ability to allocate computational resources to users in a cost effective manner by meeting a user specified criteria.

5. The ability to receive regular LOB data updates for each security in the system and process the LOB data to a common format In addition to generate inferred information from the common LOB format, for example matching orders to trades.

6. The ability to simulate inter trading venue latencies.

7. The ability to simulate the dynamics of LOBs, allowing the effects of large order submission to be modelled.

8. The ability to apply a machine learning library written in order to accept LOB data in a processed format.

9. The ability to allow the machine learning algorithms to be run on the cloud distributed architecture.

10. The ability to generate a factorized graph representation of a network of LOBs, connected by known latencies, and performing learning and inference on this representation.

11. The ability to carry out automated market surveillance using machine learning algorithms on the LOB data set.

Together, in isolation, or in any combination, these modules form may be included in an embodiment of the inventive system.

The inventive system allows users to carry out research tasks including, but not limited to: being able to predict price changes in the LOB; understanding market microstructure associated with the LOB; assisting order submission into the LOB; being able to predict order flow into the LOB; understanding LOB dynamics. Currently, predictive models maybe used to identify potential trends in these behaviors. However, they do not perform the analysis with LOB data, nor at massive scale.

In one embodiment of the invention predicting propagation of an order on a network of LOBs may be included. A predictive model can be trained to determine a probability of propagation of information on the network using feedback information. Further, the predictive model can be used to determine a probability of propagation of the message on the LOB network, such as how many and which LOBs may receive some of the information from the originating order. In another embodiment, the inventive platform system and its historic LOB data store can be used to learn the most probable structure of a network of LOBs. This graph structure may change over time. This embodiment is achieved using model evidence.

Accordingly, one or more techniques and/or systems are disclosed where information distribution on network of LOBs can be observed, for example, to determine influential nodes, and/or a potential reach of information in the LOB network by propagation. The marginal probability of a message causing a price change at any node in the network can be calculated, using a training set of LOB data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

In a first aspect of the present invention, a distributed data analysis system for use in analysing LOB data is provided, said system including: a virtual machine interface module for creating at least one virtual machine, wherein the at least one virtual machine is configured to create at least one compute unit for processing the LOB data, the at least one compute unit and the LOB data being collocated, and; an update module for updating LOB data from at least one electronic trading venue, and; a monitoring module for tracking the activity of at least one user on the system, and; a software library module having at least one algorithm for processing and/or analysing the LOB data; wherein the system is implemented in a cloud computing environment.

In this way, the system allows users to access and process large LOB data by allocating compute units on the cloud which are located with the data. This ability reduces the need to move the LOB data, which would otherwise significantly slow the processing of the data. The LOB data is constantly being added-to at the exchanges, and so the data for use by the system is updated to take account of this. In this way the user is always able to access up to date LOB data. Furthermore, the administrator of the system can monitor the activities of a user on the system for a variety of purposes, for example audit, billing, and/or access/processing control.

Optionally, the LOB data are processed to have a common format.

Electronic exchanges do not necessarily use the same format for their outgoing data. This makes processing the data computationally costly. Thus, LOB data that has come from a number of electronic exchanges may be processed such that all the LOB data has the same format. This makes any further processing of the data (either by the administrator or a user) easier and more computationally efficient. This common-format processing may take place as the LOB data enters the system. This common-format processing may occur before the LOB data is recorded for use in the system, Optionally, each of at least one user of the system comprises at least one sub-user.

A user of the system may be an organisation or company, for example. The user may be the billing entity, A sub-user may be an employee of the user. A user may have a number of associated sub-users. The user may impose controls on its sub-users. For example, the user may impose billing controls. The user may provide common software and/or algorithms for it's associated sub-users.

Optionally, each of at least one sub-user is allocated a sub-user specific filesystem.

Thus the sub-user is able to store their own code, software, processing results, files etc. on the system. These are merely provided as examples of things that a sub-user could store on their own user specific filesystem. Each sub-user's specific filesystem may be separate from each other sub-user's specific filesystem. The sub-user specific filesystem may be accessible from the system. A sub-user's specific filesystem may be mapped as a local drive on their own computer, for example their desktop/laptop computer. This means that the sub-user can operate their specific filesystem as if it were on a local drive. This is convenient for the sub-user as it hides some of the complexity introduced because the system is located on a cloud computing environment. The sub-user specific file system may be an S3 bucket.

Optionally, each user specific filesystem is sized dynamically.

Accordingly, the filesystem may grow as the user's needs increase. This may be useful where a user does not know at the outset of their processing how much storage space will be required, for example. The user's specific filesystem may also increase In size as a user makes more use of the system and begins to accumulate more results, software, data etc. on their specific filesystem. The specific filesystem may also decrease In size in response to a specific filesystem that is not fully utilised. This ensures efficient use of disk space for the system. The user specific filesystem may be an S3 bucket.

Optionally, each user specific file area is mapped to a computer belonging to the sub-user.

Optionally, computing resources are allocated to at least one user according to the requirements of the at least one user.

Accordingly, when the user executes a job, the resources to complete that job are allocated to the user according to their needs. This provides for an efficient use of resources. This also allows the user to control what kind, and/or what number, of resources their processing will use. The requirements of the user can be used to control the cost of the processing job, and/or to control the speed with which a job will be completed, for example.

Optionally, each of the at least one compute unit is a virtual machine unit.

It is therefore relatively easy for the compute units to be co-located with the LOB data, thereby reducing the need to move the LOB data during processing. Also the compute units can be created and/or destroyed as required by the processing of the user. In this way, there is no necessity for the user to maintain a costly processing computing cluster even when not in use for processing.

Optionally, the system further includes an update module for online or batch updating the LOB data.

Optionally, the system further includes a control module that allows control over which LOB data each user may access and/or process.

Accordingly, the owner of the data may be able to impose controls (or request that the administrator impose controls on their behalf), over who is able to access and/or process certain data. Equally, the administrator may decide the access control for certain data. The administrator may be able to set controls according to the source of the data or the user that created the data (if it is the product of some processing, for example). For example, data sharing between a group of a sub-users belonging to a single user may be possible.

Optionally, the system further includes a download control module that allows control over which data each user may download from the system.

As such, control may be exercised over the destination of data. Owners of data, for example electronic exchanges, may therefore be reassured that copies of their data are not being downloaded from the system without their agreement.

Optionally, the LOB data is assembled from a plurality of electronic trading venues.

Optionally, the system further includes a connection module for allowing a plurality of users to connect to the system.

The users of the system may be separate from one another on the system. The plurality of users may each have a set of common algorithms provided by the system administrator. The users may each have access to the same data, or they may each have access to different data. Data may be permissioned to allow some users to access it and to prevent other users from accessing the same data.

Optionally, the monitoring module further implements a logging method to log at least one sub-user's activity on the system.

Accordingly, the administrator can monitor the data access and/or processing of a user. Equally, the logging method may log the activity of at least one sub-user on the system. In this way, the administrator can ensure that data access and/or processing is being controlled in the desired way. Data owners may be reassured that their data is protected, for example.

Optionally, the monitoring module further implements a billing method to generate billing data for at least one user.

As such, the activity of a user can be used to determine a bill for their use of the system. This may be based on the amount of processing resources used by the user, or the amount of data they have accessed/processed. These are merely provided as examples of considerations that may be used to determine a bill for a user. A bill for a user may be based on the activity of a number of the user's associated sub-users. A bill for a user may be based on the activity of all of the user's associated sub-users. A bill may itemise the system usage and costs associated with each sub-user.

Optionally, the monitoring module further implements an audit method to audit at least one user.

Optionally, at least one algorithm is a pattern recognition algorithm.

This pattern recognition capability may be applied to the data by the administrator. The data products of this processing may then be made available to one of, a subset of, or all of the users of the system. Equally, the algorithm may be made a available for use by any number of the users. Users may pay for the use of more sophisticated algorithms.

Optionally, the monitoring module utilizes user data based on the resources used by the user and/or the data accessed by the user.

Optionally, the cloud computing environment is a public cloud computing environment.

BRIEF DESCRIPTION OF THE FIGURES

The foregoing features of the present invention may be better understood by review of the following description of an illustrative example thereof, taken in conjunction with the following drawings.

DETAILED DESCRIPTION OF THE INVENTION

Secure Connection Module

Figure 1:
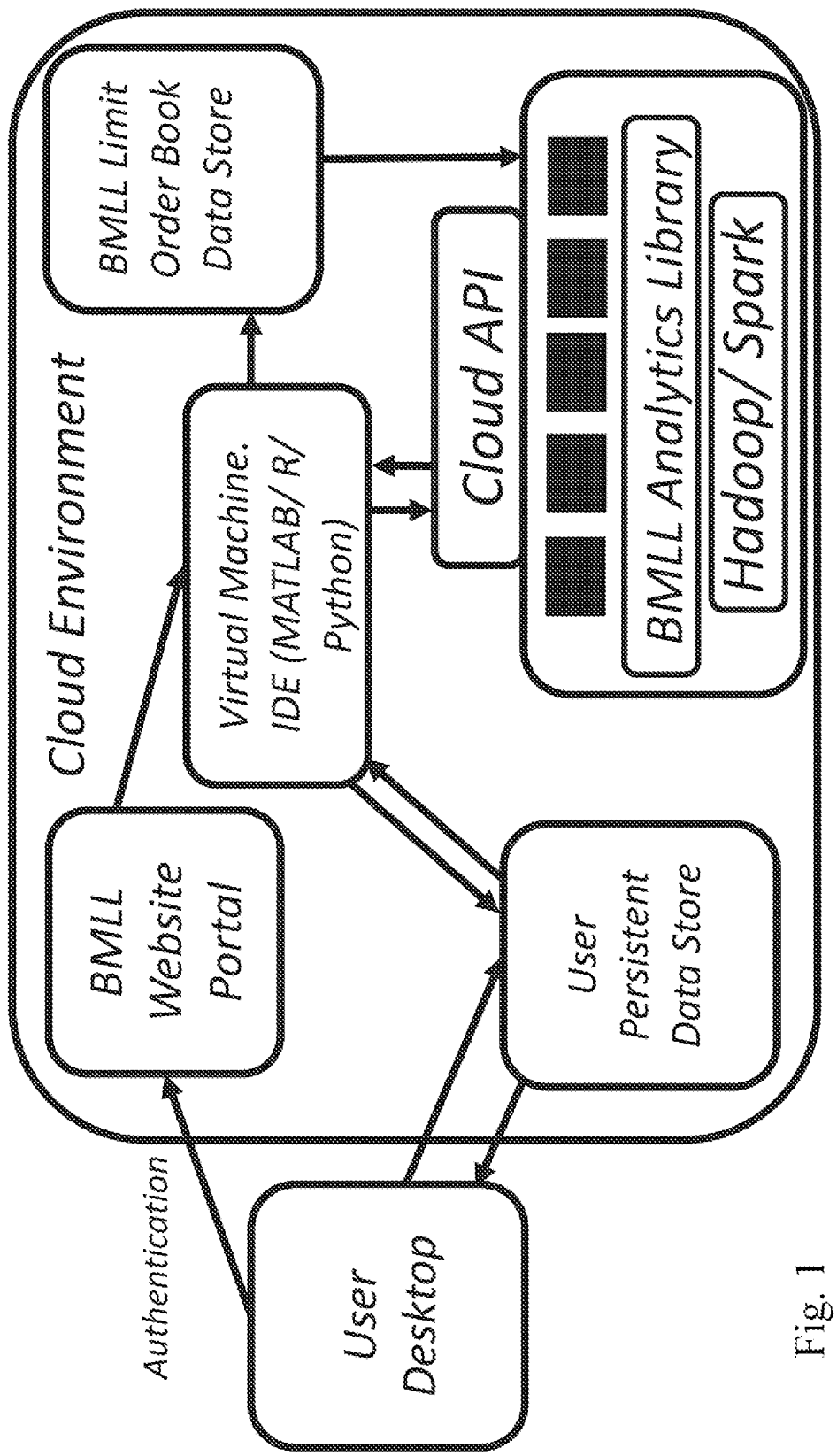
FIG. 1 depicts a high-level schematic of the present invention.
Figure 2:
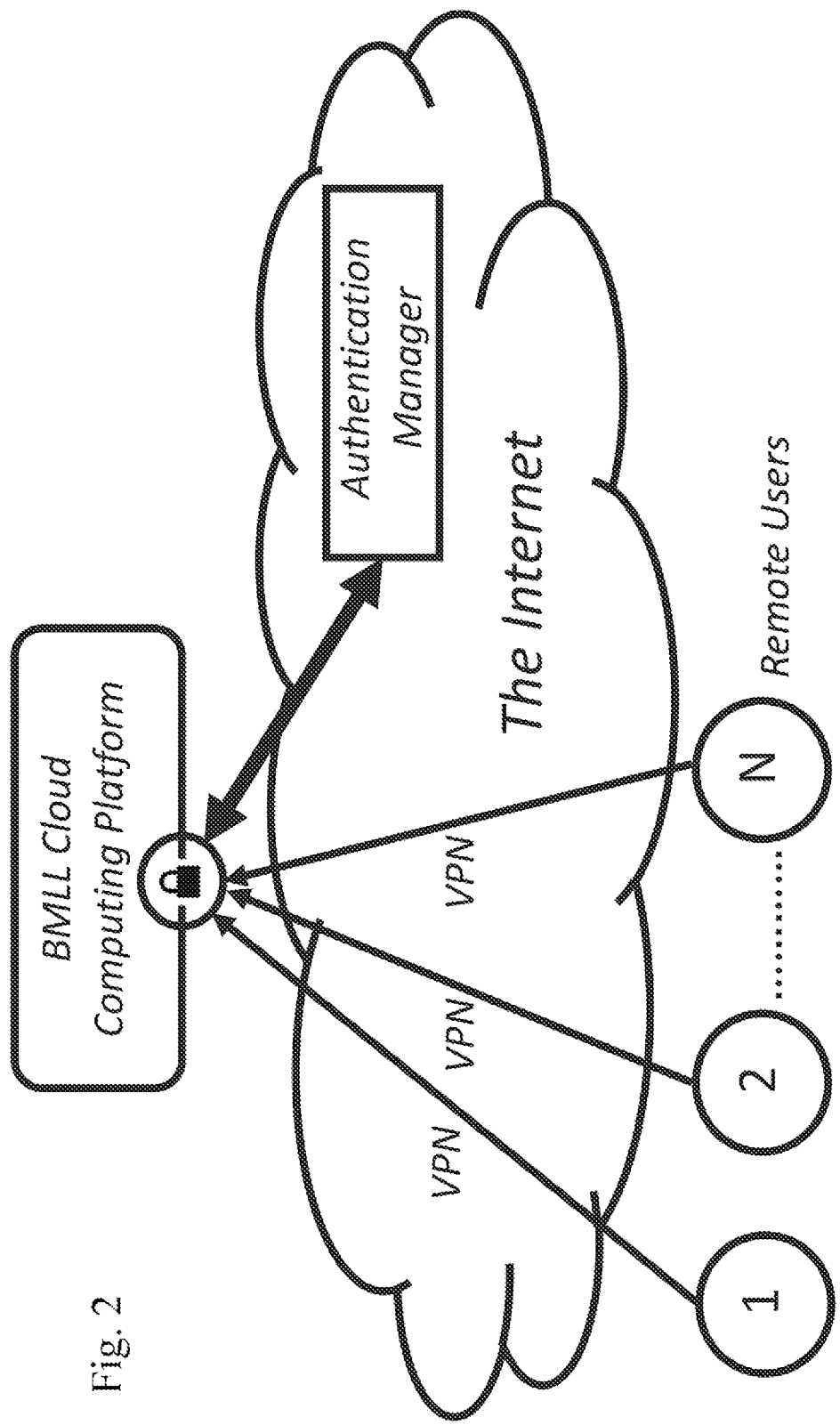
FIG. 2 shows the protocol for connecting multiple users securely to the platform of the present invention.

In the Secure Connection Module the method by which sub-users connect securely to the platform is presented. In the context of the present invention, the user may be the billable entity that has various permissioning, such as data access, allocated to it. The sub-user is an individual who actually connects to the system of the present invention. An example of a user could be an investment bank with its research staff employees as sub-users. A sub-user may connect to the system via a multi-factor authentication procedure. Each sub-user may select a password. At the point of each connection, each sub-user may be issued with a software token generated by a cryptographic process. For connection to occur, the sub-user may supply their company email address, password and key from the token. Additional constraints may be added at this point, for example restricting the IP range from which a connection can occur. The authentication may occur via a portal on a website. The website may belong to the system administrator. The website may be hosted on a webserver instance in the cloud. The sub-user may connect to the website portal using a virtual private network (VPN). The webserver may also be running an authentication agent. The authentication agent may present the token to another server that is acting as authentication manager. If the provided key matches the authentication manager key, then access may be granted to the sub-user. An example of a Secure Connection Model according to the present invention is summarized in FIG. 2.

The system may enforce the use of MFA (Multi-Factor Authentication) before it starts using the cloud platform. This adds extra layer of protection on top of the commonly used user-name and password. These multiple factors give us extra security and guard resources own by the system administrator that are located on the cloud platform.

Figure 3:
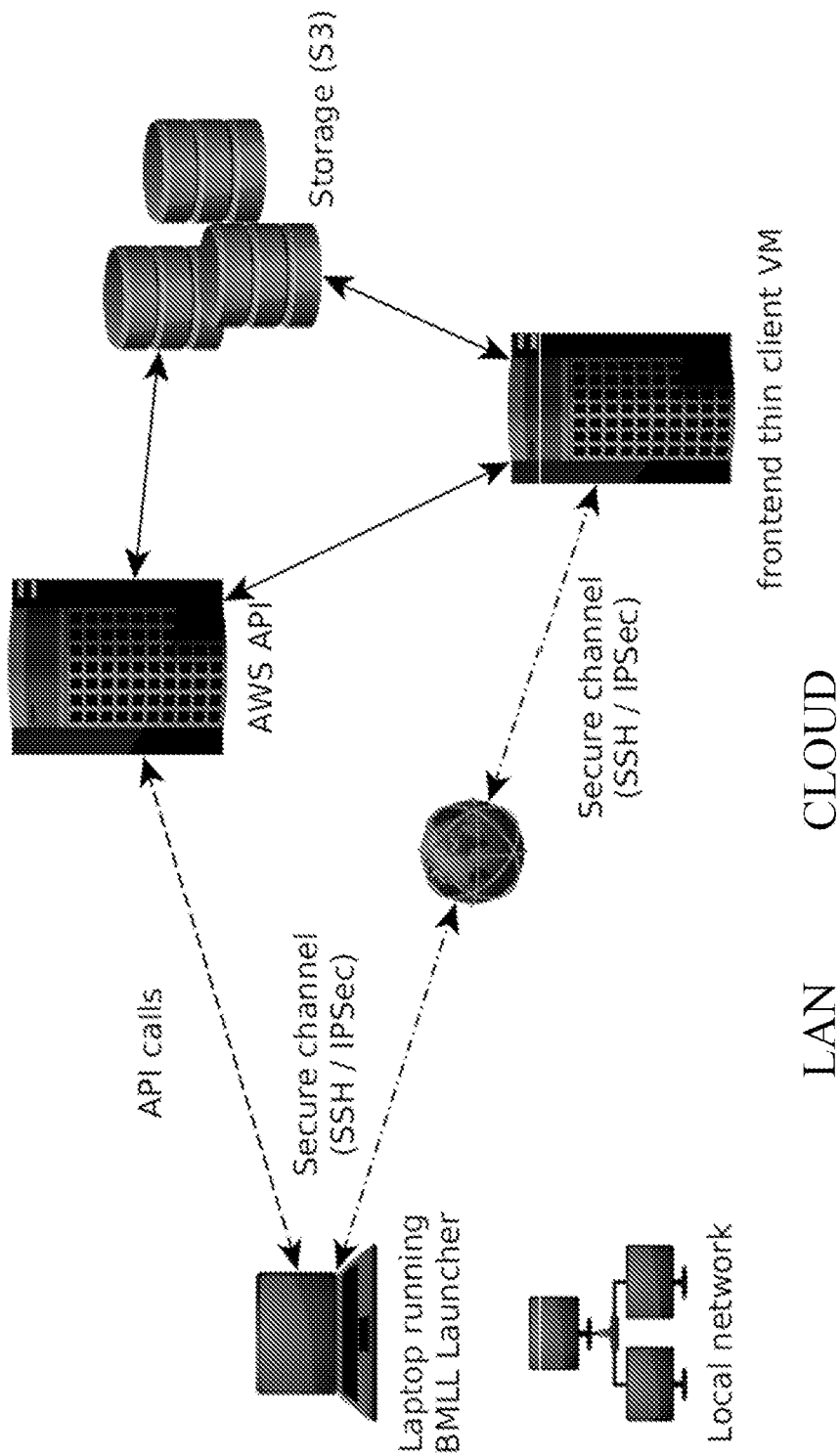
FIG. 3 shows a schematic of the system login process.

Once MFA-based authentication is successful, a secure channel is established to the front-end thin client, and this channel is used to tunnel traffic between, for example, the VNC (Virtual Network Computing) server, and the system launcher application. This process is illustrated in FIG. 3.

Virtual Machine Interface Module

In the Virtual Machine (VM) Interface Module an interface Is defined which allows the subuser to run analytics code. The sub-user interface for the system may be a VM running on the cloud. The VM is the interface where the sub-user may, for example, write code and carry out simulations and analytics on the data. Once access is authenticated by the Secure Connection Model, the VM may be automatically instantiated by loading a machine image generated and maintained by an administrator, who may be the system administrator. At this point the sub-user is able to connect from their computer to the VM, for example by way of Virtual Network Computing (VNC). A VNC connection may be setup by generating a secure tunnel to the VM using a Secure Shell (SSH) terminal emulator, for example PuTTy. Over this secure connection VNC software can be used to allow the sub-user to visualize the VM on their desktop computer. Examples of publicly available VNC software include Windows Remote Desktop Services, RealVNC and UltraVNC. The VM may be a Linux instance on the cloud platform. The VM may have the integrated development environments for the major languages installed, for example MATLAB, R and Python. Also, on the VM there may be a software library of machine learning algorithms owned by the system administrator. There may also be a software library owned by the platform administrator, for example functionality provided by the cloud environment provider. In addition, there may be software associated with selecting the number and type of instances for the job, distributing jobs over the cloud and monitoring those jobs. In this way the VM acts as a central manager for distributing jobs over the cloud environment. Code maybe compiled on the VM by the sub-user and then bootstrapped out to the allocated compute units, along with any supporting libraries required. The VM may have the user specific filesystem and the LOB data store filesystem mapped to it as local drives.

Data Processing & Access Module

In the Data Processing & Access Module LOB data is received, processed and accessed. Both historical and real-time LOB data is received from leading global electronic trading venues and/or third parties with exchange feeds by secure file transfer protocol (SFTP). A managed instance on the cloud is running a SFTP server. The received data is stored in its raw format and may also undergo several levels of processing, being stored at each level. At the simplest level of processing, data for each securities LOB may be parsed from the exchange broadcast channel into a compressed binary format. There may be one binary file produced per security per day. At the next level of processing, common algorithms may be run on the parsed data, such as the LOB rebuild algorithm (for the example of CME Globex see Christensen et al, 2013) and trade-order matching. By running these algorithms and storing the results, future simulations which require these results can be run quicker. At the final level of processing, sophisticated inference algorithms may be run on the rebuilt LOB and the results saved. Examples of such algorithms in the public domain include iceberg order detection (Christensen & Woodmansey, 2013), and VPIN (Easley et al., 2011).

Data processing may be carried out using in memory job-parallelization, allowing processing at rates far greater than that achievable by parallelization software which synchronizes with disk, such as MapReduce. To ensure no crashes, one part of this module may enforce the constraint that enough memory is always available before the task begins. This may require a method of estimating the upper limit of the tasks required memory. Such a method may be part of this module. A second part of this module may require that the job-parallelization is able to automatically request and spin-up the correct number of instances for the job, in a manner which is efficient in cost and time. Part of this process may require that relevant code is bootstrapped out over all the instances, for example by using the DataNode stores of Hadoop Distributed File System (HDFS). The jobs are then allocated to the instances. Once the job is finished the instances may be killed. All these tasks are met by a method of this module. Once the jobs have been completed and reassembled, the raw data is moved to a low-availability, low-cost filesystem. The processed data may be kept on a high-availability filesystem for future use; this is the platform administrator LOB data store. Both these filesystems are owned and administered by by the platform administrator. The platform administrator LOB data store may be a hierarchical store, where data exists sorted by trading venue, then by instrument type (for example, future, option or equity), then by ticker, then by trading day. This filesystem may be mapped as a local drive to the users VM.

Figure 4:
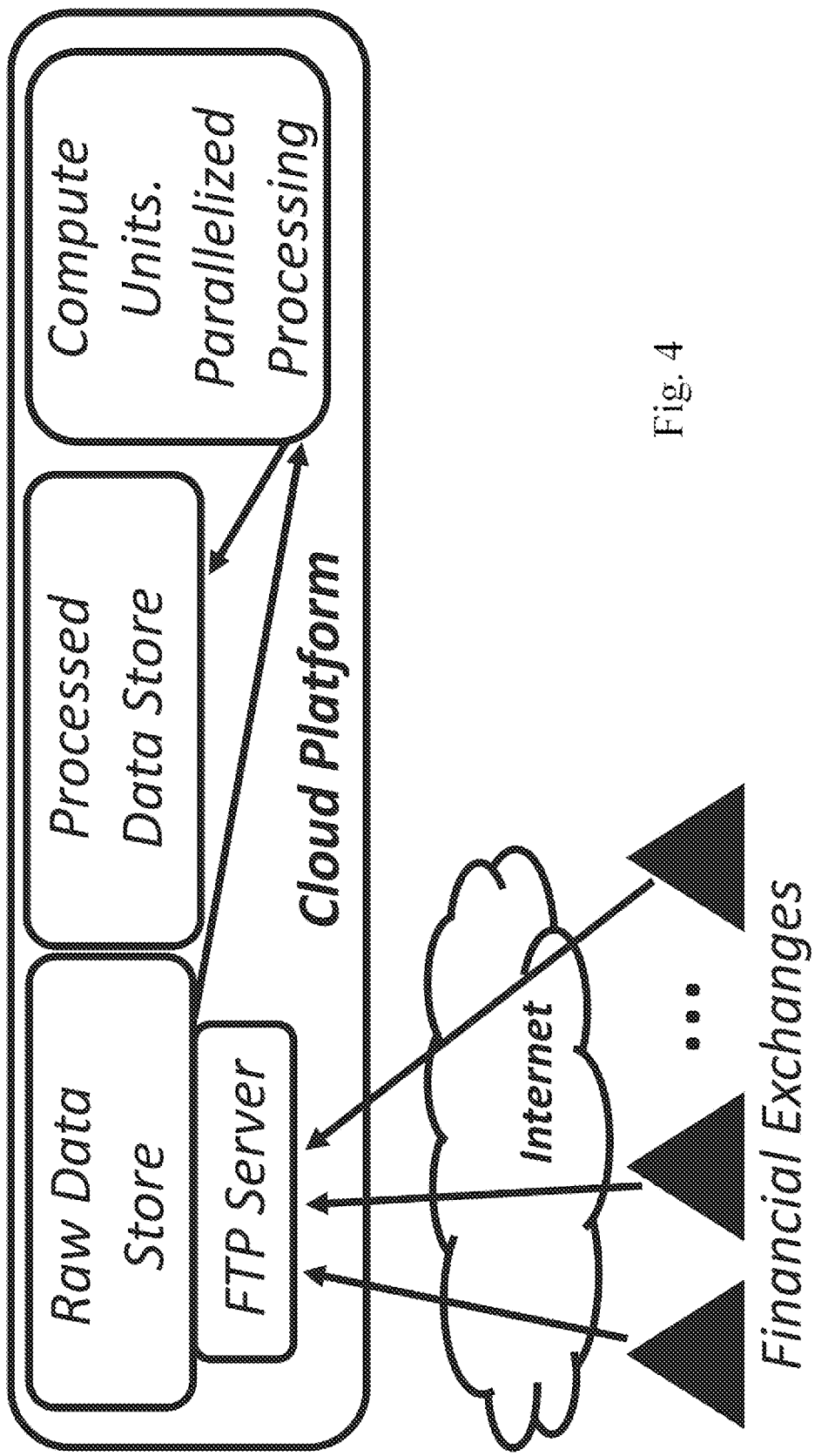
FIG. 4 shows online or batch LOB data transfers onto the platform of the present invention and subsequent processing.
Figure 5:
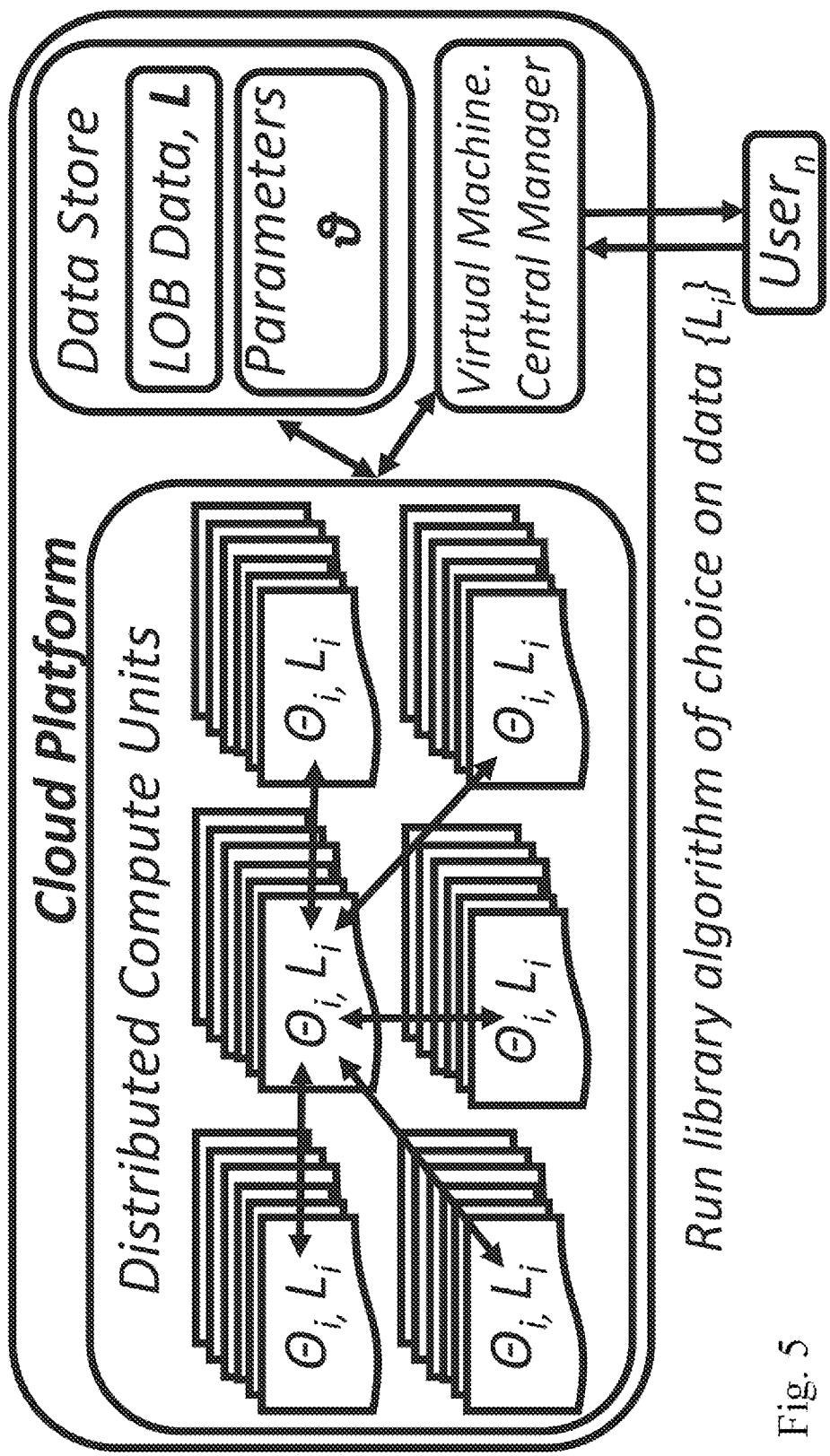
FIG. 5 depicts the distributed architecture used for message passing with LOB data.

In addition to the administrators LOB data store filesystem, each user may get a user specific filesystem. This may be a dynamic space which can grow with the amount of data a user stores in it. The user specific filesystem is unique to each user and may only be accessible to that user by multi-factor authentication. The users filesystem maps as a local drive to the users VM and also to the users desktop computer. An embodiment of the Data Processing & Access Module according to the present invention is summarized in FIG. 4.

Data Security Module

In the Data Security Module a number of security processes are implemented in code to secure the system for the user, the data owner and the platform owner. A relational database management system (RDBMS) is used to hold user ID specific information. This includes, but is not limited to, which LOB data the user ID is permissioned to access and a credit limit for cloud resource spending. The RDBMS is located on the cloud filesystem to which only the platform administrator has multi-factor authentication access to.

The Data Security Module may track in real-time the cloud resource spending associated with each user ID. The Data Security Module may check that each user does not breach the limit stored in the RDBMS. If the spending breaches the 80% and 90% levels for example, then both the user and the platform administrator may be warned, for example by email. Additionally this information may be available in near real-time for a user, for example on a user-specific dashboard for both cloud spending and data access spending.

The Data Security Module may allocate permissions for the LOB data. This may be done at the level of exchange, instrument, contract and level of processing. Explicitly stated, each file in the administrators LOB data store may be individually permissioned. Permissioning can be set to occur on an ongoing basis or between two points in time. This allows the strict data ownership and access policies set by data owners to be followed. Raw, processed or inferred data may be prevented from unauthorised transfer from the LOB data filesystem into the user specific filesystem. The process by which the transfer is prevented may be based on a cryptographic hash function in association with checks based on data size and data similarity measures. If in the case the user has purchased the data and export is allowed, then this may be reflected by a one-time key in the RDBMS. The IP address to which the data is downloaded may be recorded by the Logging Module, below. Additionally, details of all files transferred to the users filesystem may be recorded.

The Data Security Module may include batch files which set with administrator privileges certain security settings of the VM the user is connected to and any instances that VM generates. Examples of the security settings that may be modified include network packet logging and network/port access. These batch settings act to protect the legal owner of the LOB data from unauthorized access. They also act to prevent the user from breaching any conditions laid out to the platform administrator by the cloud owner, which may include but are not restricted to, preventing spam emailing and denial of service attacks. The owner of the LOB data (for example, an electronic exchange) may then be able to dictate who has access to their LOB data.

The Data Security Module may also act to ensure that the users code and generated data is secure and only accessible to themselves. The platform administrator may have no way of seeing inside the users area of the cloud or the users persistent filesystem. This is enabled by use of a secret key, known only to the user. This key is generated at the point of the VM instantiation and is required to access that VM machine and any instances generated from it for the duration of that session. In this way, the Data Security Module allows a user to securely import their confidential and proprietary code and/or data into the platform.

Logging Module

In the Logging Module a method is presented that allows user and sub-user IDs to be associated with actions and the actions logged to file. In the present invention, each user account may be a billable entity, each of which may comprise of many sub-users. An example of this could be an investment bank as the user and its research staff employees being the sub-users. The logging module may allow security analysis, resource change tracking, and compliance auditing. For example, independent auditors would be able to check the log-files to ensure that users have not been able to access or download LOB data they have not been permissioned for.

The logging module generates a log file of all user actions, including but not limited to; cloud API calls, data access, CPU time, file creation/modification/deletion, IP address of connection, details of the connecting network, bandwidth activity and instance creation/deletion. The log file may be an ASCII file with a date-time stamp per action. One log file may be generated per Secure Connection Module authentication event. The log file may be copied to an administrator's secure area, which may consist of a hierarchical file structure of folders for; Customer IDs, sub-user IDs, date and then the file. This file may also be copied to the user filesystem area, and the independent auditor filesystem, allowing full transparency.

Resource Allocation Module

In the Resource Allocation Module, resources may be allocated according to a cost-time scale specified by the sub-user. The scale may vary [0 1] with zero meaning the job is run with the lowest possible cost and one means the job is run In the quickest possible time. The Resource Allocation Module may implement a method which estimates the computational resources required or specified by a users job and then using the cost-time scale allocates resources appropriately. Cloud instance pricing varies according to factors such as type, power and number of processors, type and size of memory, size of hard disk, and age of the instance. Additionally some cloud providers allow instances to be purchased on a spot market, providing the opportunity for substantial cost savings. Agmon et al have demonstrated one possible approach for bidding in this spot market (Ben-Yehuda et al., 2013). In the Resource Allocation Module, instances may be allocated to the sub-user based on such factors, according to the sub-users preference on the scale.

User Billing Module

In the User Billing Module, the total costs a user has incurred on the platform may be calculated. A bill or invoice may be generated and hosted on a secure section of the company website. This bill/invoice may be in a portable density file (PDF) format. The users email address may be sent the bill as a link to the PDF on the website. Billing can occur quarterly, monthly, weekly intervals or at some other frequency. The frequency of the billing can be set on a customer specific basis or be equal for all customers. The sending of the bill may be an automatic process with no human intervention. The contents of each period's bill may include; connection events, LOB data files used, bandwidth used, instances spun up, CPU time incurred, analytical software fees and any other charges. The total data charges are calculable by knowing the price per file charged per time period used. The data fees may be held as static data in a relational database by the platform administrator. These fees can be updated with new data from the data owners at anytime. Each individual component in the bill may have charges against it with the total charge being the sum of these. The User Billing Module may also export the bill/invoice files onto an FTP server in a CSV format which can be directly imported into Sage (or other such) software by accountants, allowing for third party accounting and financial auditing.

Latency Module

Figure 7:
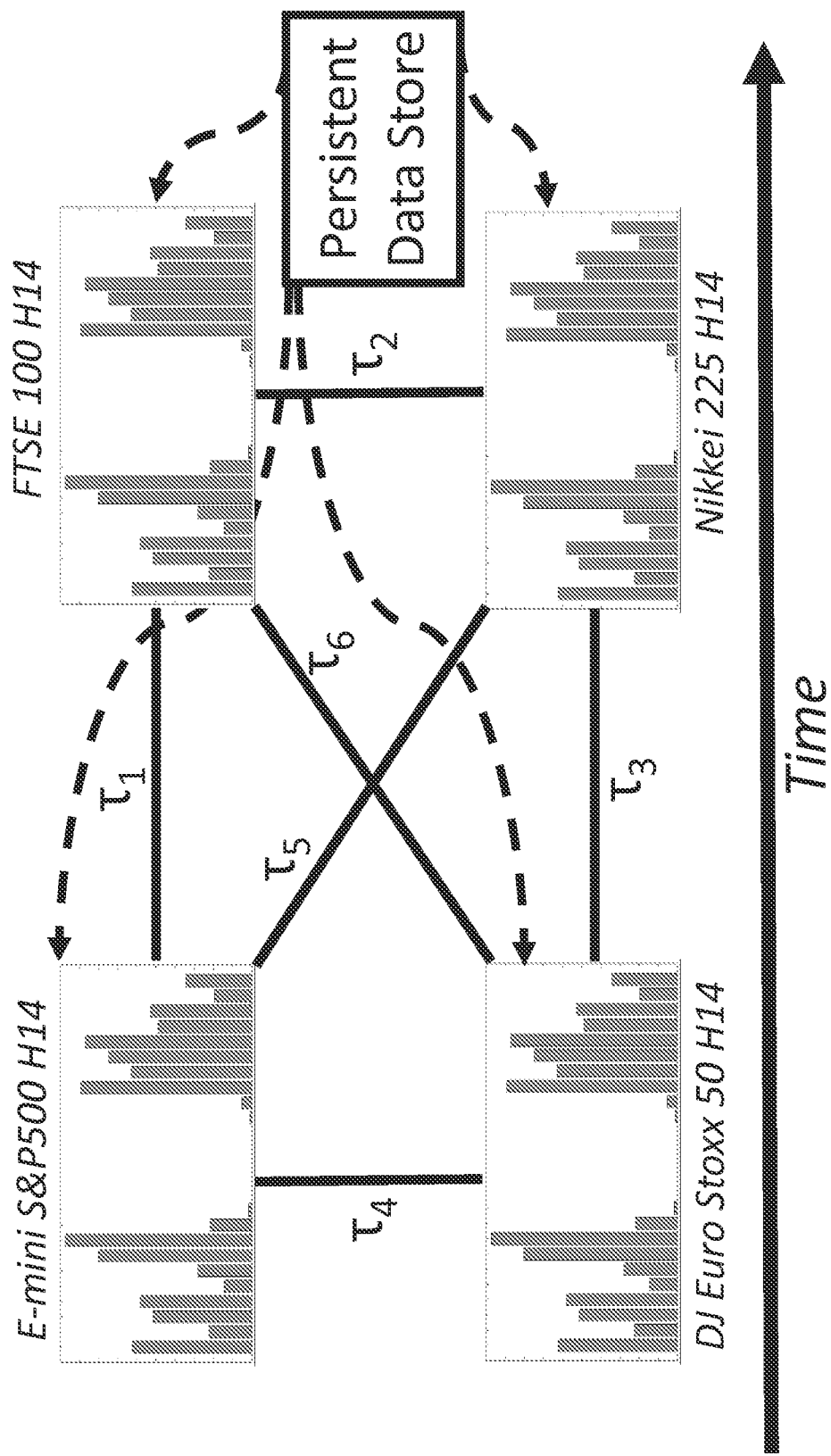
FIG. 7 depicts an example of LOBs existing in a network and being updated over time.

The Latency Module, which may be included as part of the system of the present invention, allows users to deal with the effects of the finite rate of information flow between LOBs. Data transfer between electronic trading venues occurs by use of fibre optic or microwave connections (Laughlin & Grundfest, 2014). The latency of this data transfer between venues depends on various factors, for example bandwidth, the time of day, the level of traffic and in the case of microwave, atmospheric conditions. Accurate representation of these latencies is important to market participants for various reasons. For example, being able to model fill ratios is key to the realistic simulation of a trading strategy. For many securities this ratio is highly conditional on the point in time at which an order arrives at the LOB and is inserted into the queue. Currently, leading trading firms deal with this by recording and storing data for the same security at multiple venues around the world, resulting in the same data set with different time stamps; this is expensive and inefficient In the Latency Module, a method is presented that allows this process to be mathematically represented. A schematic of LOBs connected by latencies is shown in FIG. 7.

The latencies for data transfer between each trading venue are known and recorded over time by the system administrator and/or third party providers. It is estimated these recorded latencies are the lowest latencies in the industry. The approach by which the Latency Module works is based on a sampling methodology. In this method, the present invention presents an algorithm which allows an sub-user at venue A to simulate the time stamp at which they would have received a message from venue B. We know the fastest possible time information (i.e. an order) could have traveled from B to A. In this module the sub-user can simulate the effects of latency on the point of order insertion into the LOB queue. Simulation is by way of a mathematical method that learns distributions of sampled latencies conditional on model variables. Latencies are then fitted to an exponential distribution with parameters found by maximum likelihood estimation. This formulation also allows users to insert their own latency times, resulting from their own hardware and/or inter-venue connectivity.

The latency times may be measured, or they may be obtained from third parties, or they may be approximated. The latency times may be approximated as the light travel time of the LOB from source to destination. The speed of the information may be taken as some fraction of the speed of light, for example c/4, where c is the speed of light.

The latencies may be measured over a period of time. These measured latencies may be fitted with a function form (for example a straight line function, or a spline). This allows the latencies to be represented as a function of time. The shape of this latency relationship could depend on the time of year, the time of the month, or the time of the day, for example. The functional form of the latency relationship derived from historical data can then be applied to live data. Offsets may be applied to the functional form of the latency relationship to account for hardware changes, for example.

LOB Simulator Module

The LOB Simulator Module allows the process of order execution to be simulated on the platform. The process of order execution is going from knowing that a position of given size wants to be held in a security at a given limit price, to actually holding it. The ability to efficiently realize a trading signal is a critical component for nearly all market participants. Carrying out this process efficiently is complicated for many large participants due to the activity of predatory participants, leading to market impact (also known as slippage). Market impact is where the realized price is worse than the expected price (Almgren, 2003). Previous patents have been issued in the field of market impact (U.S. Pat. Nos. 7,882,014; 8,571,967).

The LOB Simulator Module may implement a method in which a sub-user of the system can apply an algorithm module to design execution strategies which best minimize market impact and model both positive and negative feedback in the LOB. Such a module is one possible type of an LOB simulator. LOB simulators have been the subject of previous patents, for example (U.S. Ser. No. 12/060,109) and of previous academic research, for example (Gu et al., 2013). Execution in the LOB Simulator Module is benchmarked against commonly used algorithms, for example the volume-weighted average-price (VWAP) algorithm. VWAP is the industry standard for execution algorithms and represents a measure of the market average. In one example, the LOB Simulator Module works by the sub-user specifying a LOB data set and an associated trading signal. The module can be applied to both market orders and limit orders. The values of the trading signal are the signed number of units of security to be held, along with additional information such as the limit price, order type (for example, iceberg, fill-or-kill) and any duration qualifiers (for example, good till cancelled). Additionally various parameters relating to risk are specified. Examples of risk factors include how quickly the sub-user wishes to enter the position, how adverse the sub-user is to a price move against him. Such factors are related to variables such as volatility and LOB liquidity. For the given securities LOB in question, the model learns conditional probabilistic distributions associated with LOB events (order insertions, cancellations, modifications, trades etc). These distributions are dynamic over time. By learning how previous orders have interacted with the LOB, a model is generated for how the existing trading signal will interact with the LOB. From the model, inferences are made as to how market impact can be minimized.

Machine Learning Module

A selection of machine learning libraries which can be applied to distributed architectures currently exist in the public domain, for example Apache Mahout (Owen et al., 2011), MLib (http://spark.apache.org/docs/atest/mllb-guide-.html) and MLbase (Kraska et al., 2013). The problem with such libraries is that the process by which they can be applied to real data sets on a distributed architecture is complex, time-consuming and expensive. Such application generally requires reformatting of the data, interfacing with the computer languages in use in the rest of system and optimizing to the hardware layout. For a given application important algorithms maybe be missing from the library or implemented In a sub-optimal way for the data and architecture being used.

In this module we present a method for machine learning on the LOB data set on a cloud architecture. The system of the present invention may include a machine learning module. The machine learning module may implement at least one algorithm. Equally, the machine learning module may include a plurality of algorithms, wherein in each algorithm performs a different task and/or calculation. The algorithm(s) included in the machine learning module may have been optimized for the data and hardware structure in use in the present invention. The algorithms may allow for pattern recognition inside an individual LOB as well as on a network structure of multiple LOBs. Common methodologies in machine learning include, but are not limited to the following; continuous latent variable filtering (for example Kalman filtering and particle filtering), discrete latent variable filtering (for example hidden Markov models), parameter estimation (for example EM and MCMC), regression algorithms (for example automatic relevance detection and Lasso), neural networks, linear and non-linear classifiers (for example, nearest neighbour and support vector machines), probabilistic graphical model algorithms (for example, Viterbi), blind source separation (for example independent component analysis and the Hilbert-Huang transform), time-frequency analysis (for example wavelets), kernel methods (for example, Gaussian processes) and ensemble techniques (random forests, bagging, Bayesian model averaging) (Wu et al., 2008).

It can be shown that many of these methodologies can be represented by message passing (Wainwright & Jordan, 2008). Examples from the literature include; EM (Dauwels et al., 2005), recursive least squares, linear minimum-mean-squared-error estimation, Kalman filtering (Loeliger et al., 2007), hidden-Markov models (Murphy, 2001), fast-Fourier transform (FFT) (Kschischang, 2001), probabilistic PCA (Winn et al., 2005) and particle filtering (Dauwels et al., 2006). This module includes message passing implementations of these algorithms among others.

Automated Market Surveillance Module

The system of the present invention may include an automated market surveillance module. The Automated Market Surveillance Module enables suitably authorized entities to perform their regulatory duties by monitoring the financial markets. Examples of such entities may include financial regulators, intelligence agencies, law enforcement and the exchanges themselves. The Automated Market Surveillance Module may have multiple components. One component may be software that runs at the exchanges. This component may generate a time series binary file containing the unique IDs of all submitted orders on the exchange. One such file may be generated per tradeable security per day, for example. This file may allow 1:1 or 1:many matching with the historical data file for the LOB which is held on the platform. The "user ID file" may be in the format of tab separated integers. For example, for CME Globex the user ID is equal to Tag 50. Each integer corresponds directly to a direct market access connection. The exchange also holds a second file, the "user company file", which maps the user ID to a company entity. In the case of a connection which accesses the platform on behalf of another user, such as a broker, the recorded user ID will be that of the broker. It is the brokers requirement to hold their customers details. Both the user ID and user company files are private information and can only be accessed by suitably authorized entities. Both these files may be kept on a computer system owned by the exchange. In the present invention, when a suitably authorized entity wishes to perform market surveillance, they can access the files and load them via their secure area to the system.

A second component of the Automated Market Surveillance Module may be run on the system of the present invention. It allows an authorized entity to carry out batch or near real-time analysis of the LOB data including user IDs. This software component may implement a method to merge the user ID files with the historical LOB files. The authorized entity can then carry out analysis conditional on the user ID. This includes, but is not limited to, reverse engineering the users trading algorithm (i.e. the users trading signal) and looking for collaborative behavior between different user IDs. The authorized entity can automatically apply pattern recognition approaches to detect market infringements. The pattern recognition approaches may be enabled by the system administrators Machine Learning Module.

An illustrative example will now be provided. The financial regulator in the United Kingdom, the Financial Conduct Authority, has stated layering (aka spoofing, a form of market manipulation) activity is illegal (Financial Conduct Authority, 2009). By applying the user ID file to the system of the present invention, this activity can be automatically detected by an authorized entity by detecting the known patterns associated with layering. By using the user company file, the ID can be assigned to a company entity and appropriate action taken against the illegal activity. Such a process can either be run off-line as part of an investigation, or on-line in an automated fashion, allowing authorized entities to automatically detect market infringements.

Distributed Message Passing Module

Introduction

In the Distributed Message Passing Module a method for representing a set of LOBs as a PGM in a distributed setting and then carrying out Bayesian learning and inference is presented. In the general sense, Bayesian simply refers to applying probability theory for reasoning about anything unknown. When carrying out learning and inference on a graph, various approaches are possible conditional on the exact specifics of the case; is a frequentist or Bayesian approach desired?; is the data fully or partially observable?; are the random variables (r.v.) directly observable or latent?; is the graph directed or undirected?. The system described herein includes a selection of methods to deal with these possibilities.

Figure 6:
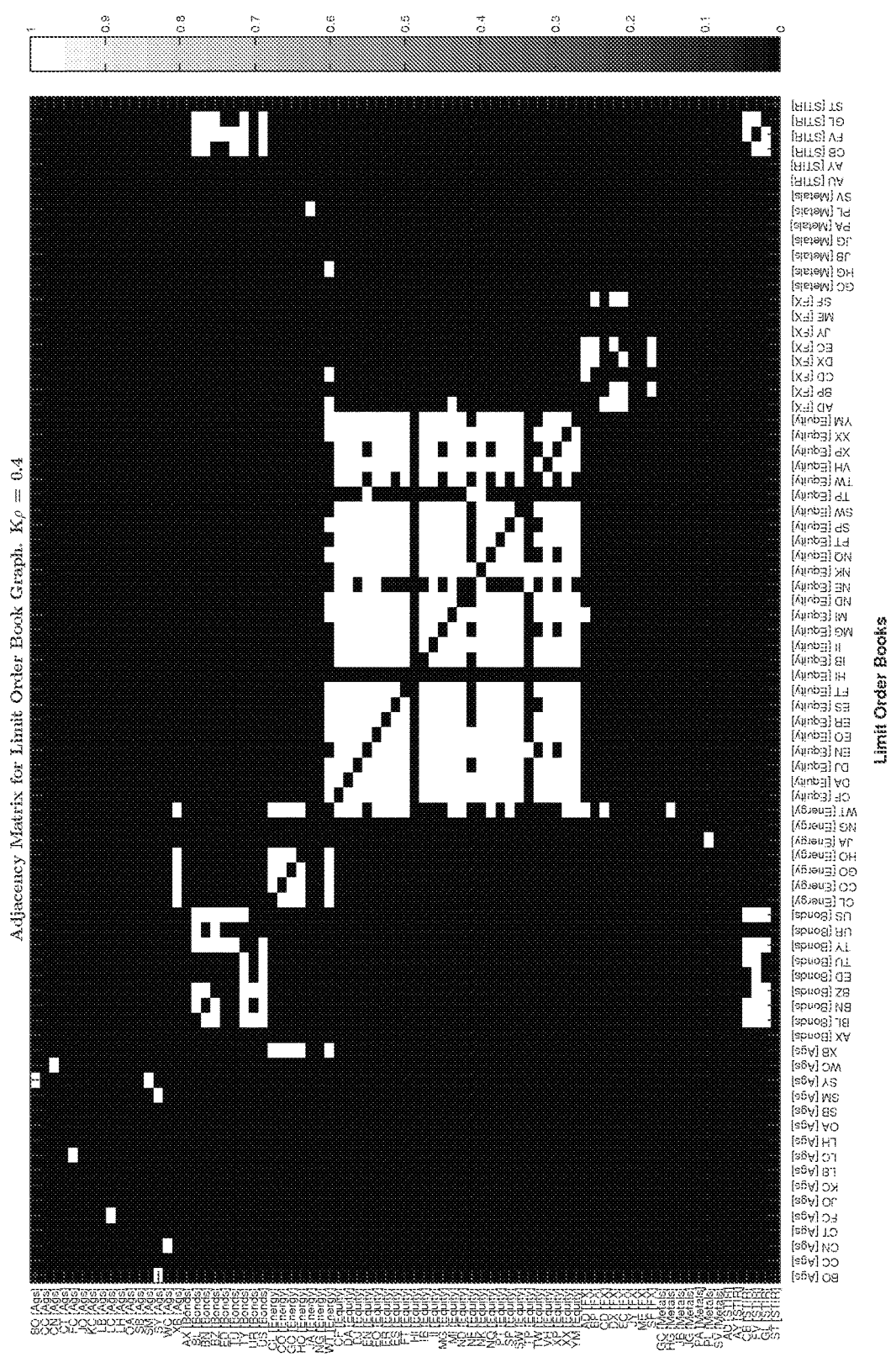
FIG. 6 gives an example of an adjacency matrix graph structure based on the covariance of a set of LOBs.

In the case of the LOB data set, for the inter-LOB edges the direction of information flow is assumed to be bi-directional, leading to undirected edges. For the edges which connect LOBs to macro-economic data releases, the information is assumed to flow from the macro-economic node to the LOB nodes, leading to directed edges. When considered as a whole, this structure gives a partially directed network. The observable nodes in the model herein described are discrete and correspond to factors such as order price (which exists on a grid with spacing equal to the tick-size), order size ($Z^+$), number of orders ($Z^+$) and time of order arrival (which exists on a grid with spacing equal to the capture precision). Additionally categorical information may exist such as if an order is real or implied. In addition to the observable nodes, there exists latent nodes and unobserved nodes. Latent nodes correspond to factors which can never be observed (for example, market sentiment), while unobserved nodes correspond to observable data which we don't have (for example, LOB data we don't have). Latent nodes maybe discrete or continuous. We only assume connections between the observable nodes. This is because information transfer in LOB financial markets can only ever occur by orders. Latent nodes only have connections to their observable counterparts. A for the graph structure is estimated by an adjacency matrix. Edge weights are derived from the covariance of the system. To generate a sparse structure, edge weights are set equal to zero if $|\rho| \le k_\rho$ where $k_\rho$ is a model parameter that may vary over time. An example of such a graph is shown In FIG. 6. For the purposes of providing an example, the following embodiment assumes that the graph takes an undirected form.

The central task in the application of probabilistic models is the evaluation of the posterior distribution $P(Y|X, \theta)$ of the latent variables Y given the observed variables X and the model $\theta$ parameters (Bishop, 2006). Generally, the learning task is phrased as finding a function h in $$\hat{Y} = \underset{Y}{\operatorname{argmax}} h(X, Y).$$

For many models of practical interest, it is unfeasible to evaluate the posterior distribution or compute expectations with respect to this distribution. In such situations we need to approximate the answer by either stochastic or deterministic means. Stochastic techniques are not suitable to the LOB data problem as they do not scale well. Deterministic approximation schemes do scale well as they are based on analytical approximations to the posterior distribution, for example by assuming it factorizes in a particular way. Message passing is one such approximate inference technique applicable to PGMs, such that it allows for making joint predictions about collections of related random variables.

By modelling joint distributions, PGMs permit structured prediction with arbitrary patterns of missing data (including latent variables and statistical relational learning) (Stoyanov et al., 2011). Through explicitly representing how distributions are factored, PGMs can expose problem-specific structure to be exploited by generic learning and inference algorithms. Examples of existing PGM software include Pregel (Malewicz et al., 2010), Apache Hama (https://hama.apache.org), Apache Giraph (https://giraph.apache.org), GraphX (Xin et al, 2013), PowerGraph (Gonzalez et al., 2012) and GraphLab (Low et al., 2012). However, no PGM software exists that allows for all the following features,

- A range of message passing algorithms to perform approximate inference.
- A range of techniques to estimate model parameters conditional on the data.
- A range of techniques to detect graph structure conditional on the data.
- The ability to allow sequential data updates. In one setting the edges are fixed but the nodes are random variables which update over time. In another setting, both the edges and nodes change over time.
- Parallelized and distributed implementation that runs on a cloud architecture in an efficient and cost-optimized fashion.
- Has partitioning and scheduling algorithms specific to the requirements of the LOB data set.
- Interfaces with major analysis softwares, including MATLAB, R and Python.
- Can be run in an on-line or off-line setting.

LOB Data Structure

The specifics of the problem case being dealt with will now be described. We begin by representing the dataset of LOBs as a graph. A graph $G=(V, \varepsilon)$ can be described as where V are r.v. called nodes and $\varepsilon$ are statistical relationships between the nodes called edges. Two classes of nodes are latent variables $Y=\{y_1, \ldots, y_T\}$ and observed variables $X=\{x_1, \ldots, x_T\}$. The notation $x_t=\{x_1, \ldots x_i, \ldots x_I\}$ and $y_t=\{y_1, \ldots y_i, \ldots y_I\}$ refers to vectors of variables at points in time. The nodes on the graph are indexed by $\{1, \ldots, i, \ldots, I\}$. The observed variable is the LOB data, which is discrete. The latent variables may be "causes", temporary variables, or unobservable data sets, which maybe discrete or continuous. In order to apply efficient deterministic Bayesian inference to this system we need to specify probability distributions for the r.v. in the system. For the observable r.v. one possible distribution that could be applied is the gamma distribution. This member of the exponential family has been shown to fit well to empirical LOB data, for example see (Christensen et al, 2013). The gamma distribution is generalized into multiple dimensions by the Wishart distribution. Continuous probability distribution functions can be converted to probability mass functions as required by discretization. Example of other distributions that maybe applied to the r.v. In this model include, but are not limited to Gaussian, Dirichlet and multinomial. The nodes in our graph are connected using (mostly) undirected edges in a loopy structure. The graph is described as sparse, as direct relationships only exist between some nodes. The economic interpretation of this is that most market participants do not connect to most nodes. The graph associates each node $i \in V$ with a latent r.v. $y_i$ and a observation $x_i$. Also associated with each node is a model parameter $\theta=\{\theta_1, \ldots \theta_k, \ldots \theta_K\}$, where $\Theta_t=\{\theta_1, \ldots \theta_i, \ldots \theta_I\}$. This r.v. s called the feature vector and contains K explanatory variables for the model (Guyon & Elisseeff, 2003). These variables represent some set of problem specific features extracted from the signal. Possible examples of $\theta$ components include, but are not limited to; a drift term, volatility term, measure of rate of change of price, order imbalance sensitivity term, market impact sensitivity term, order placement feedback term, expected order flow term and standard deviation of liquidity term. For the embodiment described here a Gaussian belief distribution over $\theta$ is assumed, though the belief distribution can be modeled by any distribution from the exponential family while still allowing for approximate tractable inference.

Graphical Inference

For data set $\mathcal{D}$, we want to find the parameters that maximize $p(\theta)p(\mathcal{D}|\theta)$. To do this we need to approximate the posterior distribution $p(\theta|\mathcal{D})$. Specifying a joint distribution over the data and the parameters, $$p(D,\theta)=p(D|\theta)p(\theta)$$

Bayes rule gives the posterior, $$p(\theta|\mathcal{D}) = \frac{p(\mathcal{D}|\theta)p(\theta)}{p(\mathcal{D})}$$

where $p(\mathcal{D})$ is the marginal likelihood, $$p(D)=\int_\theta p(D|\theta)p(D)d\theta$$

We specify that our problem is modeled by a type of PGM called a Markov random field (MRF). MRFs are useful in modeling a variety of phenomena where one cannot naturally ascribe a directionality to the interaction between r.v. (Koller & Friedman, 2009). MRFs give a model that allows representation of seemingly symmetrical correlations between variables without forcing a specific direction to the influence. This model can be viewed as defining a set of independence e assumptions determined by the graph structure and as such, the graph is a data structure for specifying a probability distribution in a factored form. The factorization is defined as a product of factors over cliques in the graph, where a clique is a subset of an MRFs vertices such that every two vertices in the subset are connected by an edge.

An embodiment of the invention may make use of two classes of MRFs; unconditional and conditional. Unconditional MRFs encode a joint distribution over X giving P(X). They are parameterized by a general-purpose function called a factor $\psi$. A distribution $P_\psi$, parameterized by set of factors (the clique potentials) $\Psi=\{\psi_1(\mathcal{D}_1), \ldots, \psi_r(\mathcal{D}_r)\}$ where $\mathcal{D}_i \subseteq X$, can be represented as, $$p(X|\theta) = \frac{1}{Z(\theta)} \prod_{c \in C} \psi_c(X_c|\theta_c)$$

Where C is the set of all the (maximal) cliques of G and $Z(\theta)$ is the partition function given by $$Z(\theta) \triangleq \sum_x \prod_{c \in C} \psi_c(X_c|\theta_c)$$

Z(θ) is a global factor which couples all of the parameters across the network, preventing the estimation of local groups of parameters separately, instead requiring enumeration over all maximum cliques. This global parameter coupling has very significant theoretical and computational ramifications for carrying out machine learning on the LOB data set Conditional random fields (CRFs) are a version of an unconditional MRF where all the clique potentials are conditioned on input features. CRFs are used to encode a conditional distribution P(Y|X), where Y is a set of target variables and X is a set of observed variables (Lafferty et al., 2001). As in the unconditional case, the network is annotated with a set of factors Ψ. The encoded distribution is as follows, $$P(Y \mid X, \theta) = \frac{1}{Z(X, \theta)} \Pi_c \psi_c(Y_c \mid \theta)$$

In order to allow the encoding over P(Y|X) as opposed to P(Y, X), we avoid representing a probabilistic model over X. This allows us to incorporate into the model continuous variables whose distribution may not have a simple parametric form and observable variables whose dependencies may be quite complex or even poorly understood.

Unfortunately, (in general) there is no closed form solution for maximum likelihood (ML) or maximum a posteriori (MAP) learning on MRFs. This is due to the global partition function coupling the model parameters (Hastie et al., 2009). For graphs with and without loops, exact ML learning can be performed, though this is extremely costly due to the iterative nature of the approaches (Bishop, 2006). For the same reason of computational cost it is rare to perform Bayesian inference for the parameters of MRFs (although see Qi et al., 2006; Murray & Ghahramani, 2004). The size of the LOB data set (several petabytes) means that any learning procedure must be highly computationally efficient. In addition, any learning approach must be applicable to loopy graphs and also be able to deal with r.v. that have non-Gaussian distributions. The method by which the system of the present invention carries out learning Θ is by approximate inference through message passing. Learning is the problem of integrating data with domain knowledge of the model environment and in this light learning can be phrased as an inference problem. This approximate inference technique can be applied due to the sparse graphs which result from our method of network construction. Sparse graphs allow message passing to be highly efficient due benefiting from the graphs local structure (Martin et al., 2012). This means message passing is scalable to extremely large data sets (Gonzalez et al., 2009).

Message passing is a technique for carrying out inference on factorized graphs (Frey & Jojic, 2005). Four closely related message passing techniques are belief propagation (BP) (Kschischang et al., 2001), (Aji & McEllece, 1997), loopy belief propagation (LBP) (Murphy et al. 1999), variational message passing (VMP) (Winn et al., 2005) and expectation propagation (EP) (Minka, 2001). All these message passing algorithms, and many others, can be derived from a common framework involving minimizing divergence measures (Minka, 2005).

Figure 8:
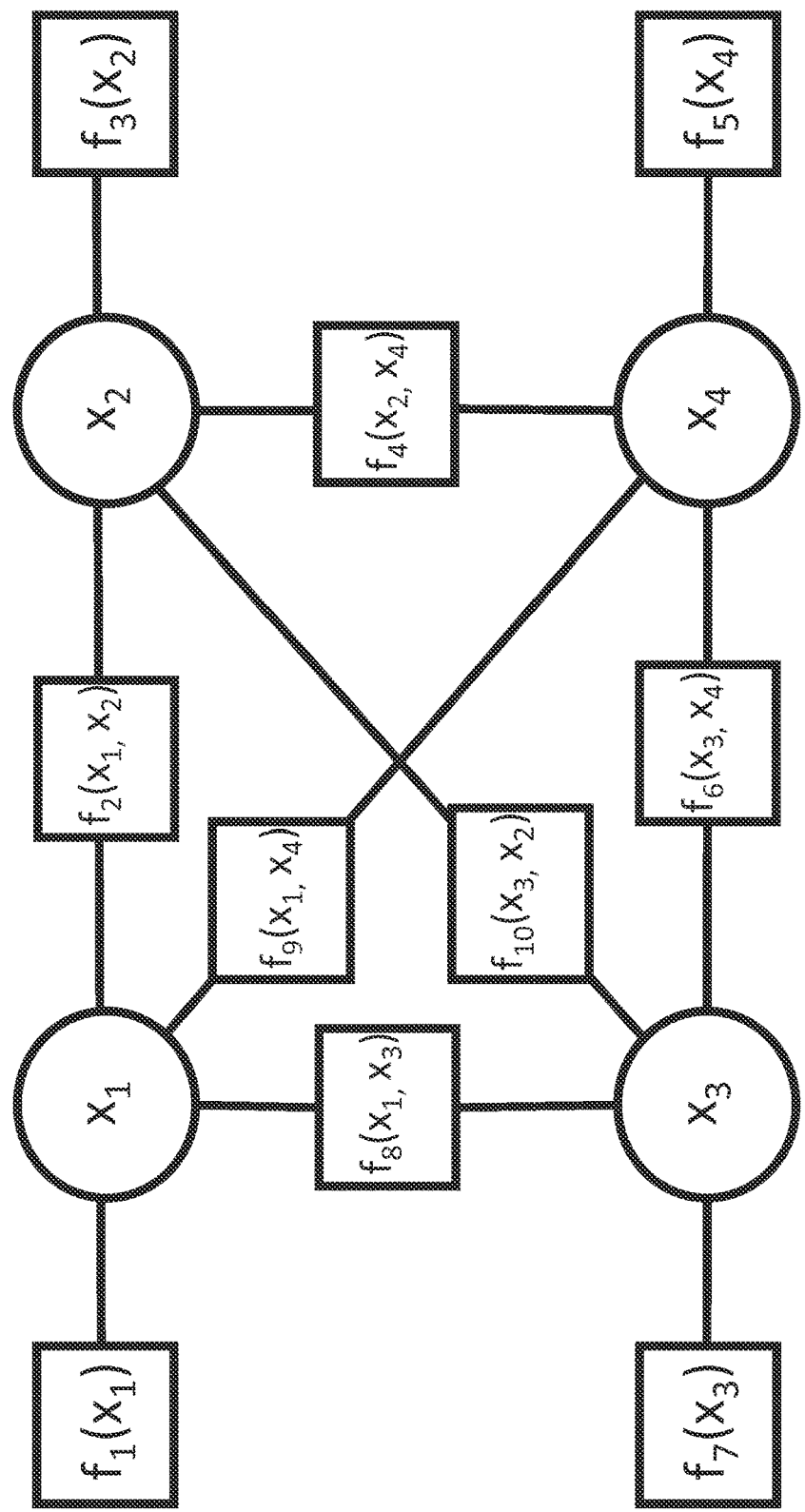
FIG. 8 gives one possible representation of a factor graph for a network of LOBs.

In order to apply the message passing approach, we restructure our graph. An MRF structure does not generally reveal all of the structure with P_Ψ. In particular, one cannot tell from the graph structure whether the factors in the parameterization involve maximal cliques or subsets thereof. An alternative representation that makes explicit the structure of the factors in the network is the factor graph F (Kschischang et al., 2001; Loeliger et al., 2007; Frey, 2002). A factor graph F is an undirected graph containing two types of nodes: one type corresponds to r.v.; the other corresponds to factors over the variables (factor nodes). The graph only contains edges between variable nodes and factor nodes. is required in the case of the LOB graph, as we have clique potentials with an order higher than pairwise (i.e. a factor may have more than two r.v.). FIG. 8 shows one possible factor graph representation of FIG. 7. In this figure, circles represent variable nodes and squares represent function nodes. Initial function nodes represent prior distributions, for example $f_1(y_1)$ is the probability $P(y_1)$, and connected function nodes represent joint probability distributions.

Message passing belongs to the general class of deterministic approximate inference algorithms based on variational inference (Jordan et al., 1999). The basic idea is to pick an approximation q(x) to the distribution from some tractable family, and then to try to make this approximation as close as possible to the true posterior, $p^*(x) \triangleq p(x|\mathcal{D})$. This is done by minimizing a divergence measure between q and p̃, where p̃ is the exact but unnormalized posterior and q is locally consistent, i.e. the joint distribution of two adjacent nodes agrees with the corresponding marginals. Suppose p*(x) is our true but intractable distribution and q(x) is some approximation, chosen from some tractable family, such as a multivariate Gaussian or a factored distribution. We assume q has some free parameters which we want to optimize so as to make q "similar to" p*. We do this by minimizing the KL divergence (Kullback & Lelbler, 1951), $$\mathbb{KL}(p^* \| q) = \sum_x p^*(x) \log \frac{p^*(x)}{q(x)}$$

However, this is hard to compute, since taking expectations wrt p* is assumed to be intractable. A second divergence measure is a generalization of KL divergence, called the α-divergence (Amari, 1985), $$\mathcal{D}_\alpha(p \| q) \triangleq \frac{4}{1-\alpha^2}\left(1 - \int p(x)^{1+\alpha} q(x)^{1-\alpha/2} dx\right)$$

$\mathbb{KL}(p\|q)$ corresponds to the limit α→1, whereas $\mathbb{KL}(g\|p)$ corresponds to the limit α→−1.

We begin carrying out message passing by minimizing $\mathbb{KL}(q\|p)$. This approach is commonly known as LBP and is implemented by passing exact messages around a factor graph, even when the graph contains loops (Kschischang, et al., 2001). The idea is that exact messages are passed from variable to factor and then from factor back to variable. All nodes receive messages from their neighbours, they then updates their belief states and finally send new messages back out to their neighbors; this process is repeated until convergence. When this process is applied to the LOB graph, due to the size of the graph, numerical underflow occurs (Kingsbury & Rayner, 1971). We deal with this by working in logarithmic space. Scalar LBP is summarized in Algorithm 1.

1: Input factors $f$, variables {y, x}
2: Initialize messages m(x)=1

3: Initialize beliefs bel(x)=1 for all nodes
4: repeat
5: send message on each edge
6: $m_{x \to f}(x) = \Pi_{h \in nbr(x) \backslash \{f\}} m_{h \to x}(x)$ {Var. to fac.}
7: $m_{f \to x}(x) = \Sigma_y f(x,y) \Pi_{y \in nbr(f) \backslash \{x\}} m_{y \to f}(y)$ {Fac. To var.}
8: Update belief of each node $bel(x) \propto \Pi_{f \in nbr(x)} m_{f \to x}(x)$
9: until {Until beliefs don't change significantly}
10: Return marginal beliefs bel(x)

Algorithm 1 (Above): LBP for a Factor Graph

Figure 9:
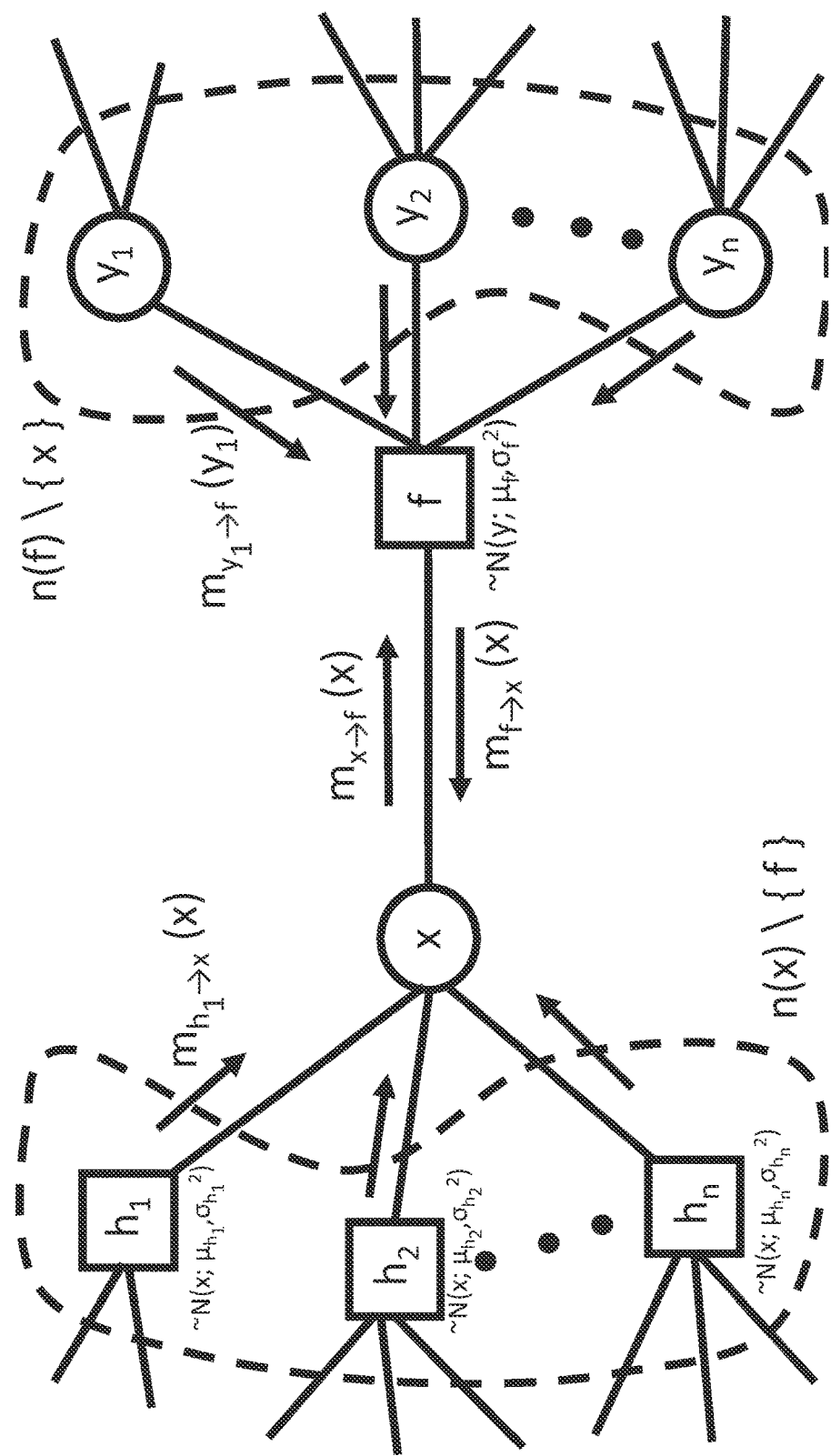
FIG. 9 demonstrates message passing on a bipartite Gaussian factor graph.
Figure 10:
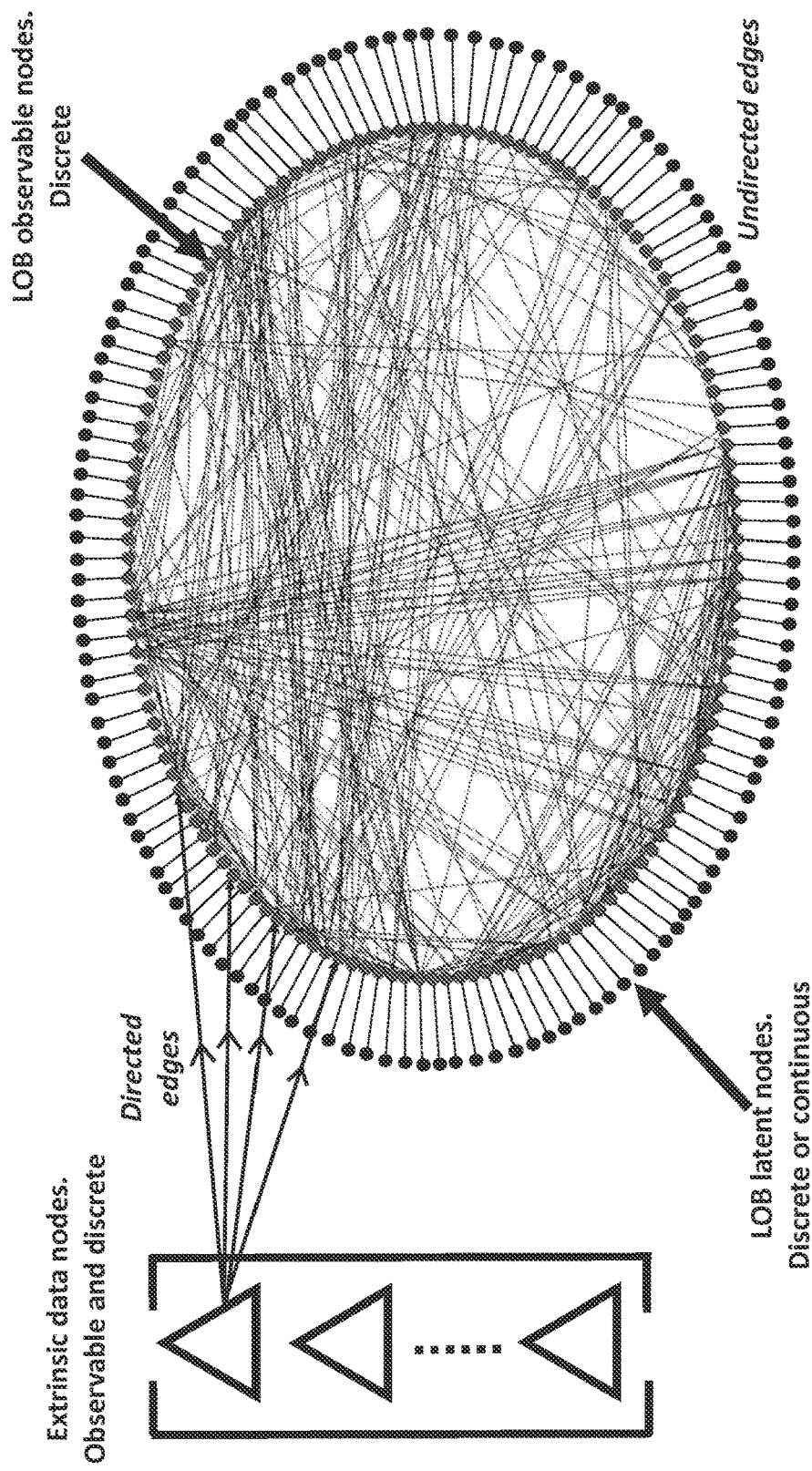
FIG. 10 shows one possible example of graph structure with directed edges for extrinsic data and undirected edges for LOB data. Observable and latent variable nodes are shown.

Here nbr(x) are all the factors that are connected to variable x, and nbr(f) are all the variables that are connected to factor f. Message updates are just additions of the exponential family parameters η where $m(x) \propto \exp(\psi(x)\eta)$. At the point of convergence we compute the final beliefs as a product of incoming messages. One of the problems with this scheme is that message convergence can be slow and unstable. We deal with this by damping the message $m^k$, $$\tilde{m}^k(x) = \lambda m(x) + (1-\lambda) \tilde{m}_{ts}^{k-1}(x)$$

where $0 \leq \lambda \leq 1$ is the damping factor which we set λ=0.5. The speed of convergence also depends on the schedule by which messages are sent out. We apply a modified version of the residual belief propagation algorithm (RBP) (Elidan et al., 2012; Sutton & McCallum, 2012). Here messages are sent out asynchronously according to $$m_i^{k+1} = f_i(\{m_j^{k+1}: j<i\}, \{m_j^k: j>i\})$$

where the message for edge i is computed using new messages (iteration k+1) from edges earlier in the ordering, and using old messages (iteration k) from edges later in the ordering. The order in which the messages are sent is according to the of norm of the difference from their previous value. By using an upper bound on these message residuals, messages are only computed if they are to be sent, giving significant computational improvements. This is important as the cost of computing each message in LBP is $O(K^f)$ where K is the number of states in the r.v., and f is the size of the largest factor (f=2 for pairwise MRFs). This computational complexity is good, as long as the number of "hub-like" nodes is small. Examples of hub-like nodes in our graph structure are those with high liquidity which are central to price discovery, for example e-mini S&P500 future, EURUSD fx-spot and US Treasury ten year bond. For Algorithm 1 when the underlying distributions are Gaussian, extension from scalar to vector form is easy (Alag & Agogino, 1996). Scalar messages have the $m(x) \alpha \exp^{-(x-\mu)^2/2\sigma^2}$ form continue, while vector $m(x) \propto \exp-(x-\mu)^T \Sigma (x-\mu)$ messages have the form In summary if the graph is a tree and has Gaussian or discrete r.v., BP is exact. If the graph is loopy and has Gaussian or discrete r.v. LBP works well, though while the posterior means are exact, the posterior variances are often too small (Weiss & Freeman, 2001). The process of LBP on a factor graph is shown in FIG. 9.

Unfortunately, for several cases, including continuous r.v., mixed discrete and continuous r.v. and non-Gaussian r.v., trying minimizing $\mathbb{KL}(q\|p)$ by sending exact messages does not work. In this case, we apply a moment-matching technique to approximate the messages which is equivalent to trying to locally optimize $\mathbb{KL}(p\|q)$ This approach is called EP (Minka, 2001). EP is a form of BP where the messages are approximated, and can be shown to reduce to BP when the approximating distribution is fully factorized (Minka, 2001). The method generalizes the ADF algorithm by allowing iterative refinements of the approximations (Maybeck, 1982). The invention may apply EP by approximating the posterior at each step using an assumed functional form, such as a Gaussian. If q is in the exponential family of distributions, the posterior can be computed using moment matching, which locally optimizes $\mathbb{KL}(p\|q)$ or a single term (Yang et al., 2012). For natural parameters η, the exponential family is given by, $$q(\theta|\eta) = h(\theta)g(\eta) \exp\{(\eta^T u(\theta)\}$$

Where θ may be scalar or vector and may be discrete or continuous. The divergence of p(θ) w.r.t to q(θ) as a function of η is $$\mathbb{KL}(p\|q) = -\ln g(\eta) - \eta^T \mathbb{E}_{p(\theta)}[u(\theta)].$$

Minimizing this Gives, $$\mathbb{E}_{q(\theta)}[u(\theta)] = \mathbb{E}_{p(\theta)}[u(\theta)]$$

where the solution corresponds to matching the expected sufficient statistics. Hence In the Gaussian case, for $p(\theta) \sim N(\theta; \mu_p, \sigma_p^2)$ $\mathbb{KL}(p\|q)$ is minimized by setting $q(\theta) \sim N(\theta; \mu_p, \sigma_p^2)$. i.e. if each of the $\tilde{f}_i(\theta)$ is Gaussian, then the overall approximation q(θ) will also be Gaussian. Other than choosing which approximating family q(θ) to apply, the second decision we must decide on is how to factor the joint distribution $p(\theta, \mathcal{D})$ into terms $f_i(\theta)$. We do this by grouping factors $f_i(\theta)$ together into sets, which allows us to refine all the factors in a set together at each iteration. This approach is now applied to factor graphs in Algorithm 2 to give a practical method for approximate inference. This algorithm can estimate the posterior distribution $p(\theta|\mathcal{D})$ allowing parameters to be found and model predictions to be made, as well as using the model evidence $p(\mathcal{D})$ for model comparison. For the case of learning model parameters θ, is the hidden variable and $\mathcal{D}$ is a joint distribution of data.

Algorithm 2: Expectation Propagation on a Factor Graph

1. Posterior given by: $p(\theta) = \Pi_i f_i(\theta_i)$ ($\theta_i$ is a subset of variables associated with $f_i$).
2. Approximate with fully factorized distribution: $q(\theta) \propto \Pi_i \Pi_k \tilde{f}_{ik}(\theta_k)$
3. repeat
4. Choose a factor $\tilde{f}_{jl}(\theta_l)$ to refine
5. Remove $\tilde{f}_{jl}$ from the posterior by dividing it out $q_{-j}(\theta) \propto \Pi_{i \neq j} \Pi_k \tilde{f}_{ik}(\theta_k)$
6. Multiply by exact factor and find the marginal: $q_{-j}(\theta) f_j(\theta_j)$ {Only consider dependence on $\theta_l$}
7. Compute the new posterior $q^{new}(\theta)$ by moment matching:

$$\min_{q^{new}(\theta)} \mathbb{KL}\left(\frac{1}{Z_{jl}} f_{jl}(\theta_l) q_{-j}(\theta) \| q^{new}(\theta)\right)$$

8. Compute the new factor (message) that was implicitly used:

$$\tilde{f}_{jl}(\theta_l) \propto \sum_{\theta_{m \neq l} \in \theta_j} f_j(\theta_j) \prod_k \prod_{m \neq l} \tilde{f}_{km}(\theta_m)$$

9. until {until convergence}
10. Approximate the marginal likelihood: $(D) \approx \int \Pi_i \Pi_k \tilde{f}_{ik}(\theta_k) d\theta_k$ The quantity $\tilde{f}_{jm}(\theta_m)$ corresponds to the message $m_{\theta_j \to \theta_m}(\theta_m)$ which factor node j sends to variable node m (Bishop, 2006). The product over k on line 8 of Algorithm 2 is over all factors that depend on the variables $\theta_m$ that have variables (other than $\theta_j$) in common with factor $f_j(\theta_j)$. Further and additional modifications to the embodiment just described include optimizing the α-divergence measure and partially disconnecting the graph to perform local propagation. In summary, the invention platform may apply Algorithm 2 by computing the outgoing message from a factor node by taking the product of all incoming messages from other factor nodes, multiplying by the local factor node and then marginalizing. It is by this method we learn the parameters θ in our LOB network.

Up until now, we have taken a simplistic approach to the graph structure on the platform. Having introduced Bayesian inference, this can now be improved. The same issues with the partition function of MRFs which affect parameter learning, also impact on structure learning (Koller & Friedman, 2009). In order to estimate model structure M we would like to compute a posterior distribution over graph structures and make predictions by averaging w.r.t. this distribution. For observed data set $\mathcal{D}$ and prior P(M) over the graphs, $$P(M|\mathcal{D},\theta) = \frac{P(\mathcal{D}|M,\theta)P(M|\theta)}{P(\mathcal{D}|\theta)}$$

where the marginal likelihood (also known as the partition function, or the model evidence) is given by, $$P(\mathcal{D}|\theta) = \int P(\mathcal{D}|M,\theta)P(M|\theta)dM$$

For reasons already discussed, an exact computation of the marginal likelihood is not possible (Parise & Welling, 2006). Hence we use an approximation given by message passing. This allows us to carry out Bayesian model comparison, a method of model selection based on Bayes factors, B $$B = \frac{P(\mathcal{D}|M_i,\theta)}{P(\mathcal{D}|M_{i+1},\theta)}$$

Where $M_i$ is a model under consideration.

The final part of the graphical inference problem implemented on the platform is the ability to use the model to carry out prediction. Generalized linear models (GLM) are a generalization of ordinary linear regression, allowing for response variables with non-Gaussian error distributions (Dey et al., 2000). GLMs requires three elements; a distribution from the exponential family, a linear predictor and a link function (. This may be implement in the invention as, $$p(y_i|\theta,x_i) = \Phi(y_i\theta^T x_i)$$

where $y_i$ is conditionally independent from other $y_j$ given θ and $x_i$, i.e. it is assumed that $y_i$'s can be generated simply based on θ and $x_i$. In order to allow approximate tractable inference the system of the present invention may specify the prior p(θ) is a member of the exponential family. In one possible implementation a factorizing Gaussian belief θ distribution over is assumed, $$p(\theta) = \prod_k N(\theta_k; \mu_k, \sigma_k^2)$$

In this case, when Φ=1, we recover Bayesian linear regression in the graphical setting.

Distributed Approximate Inference

When data is abundant, approximate inference needs to be performed in a distributed setting (Bekkerman t al., 2012; Schwing et al., 2011). The LOB graph is both large in size and updates rapidly over time. In such cases the graph can not fit on a single machine, and so implementation needs to be distributed over a cluster of machines (instances). I graphical algorithms simply follow the edges of the graph, and so introduce significant overhead due to machine-to-machine communication. In this method we present an approach for applying the previously described message passing to the processed data in a distributed environment.

Figure 11:
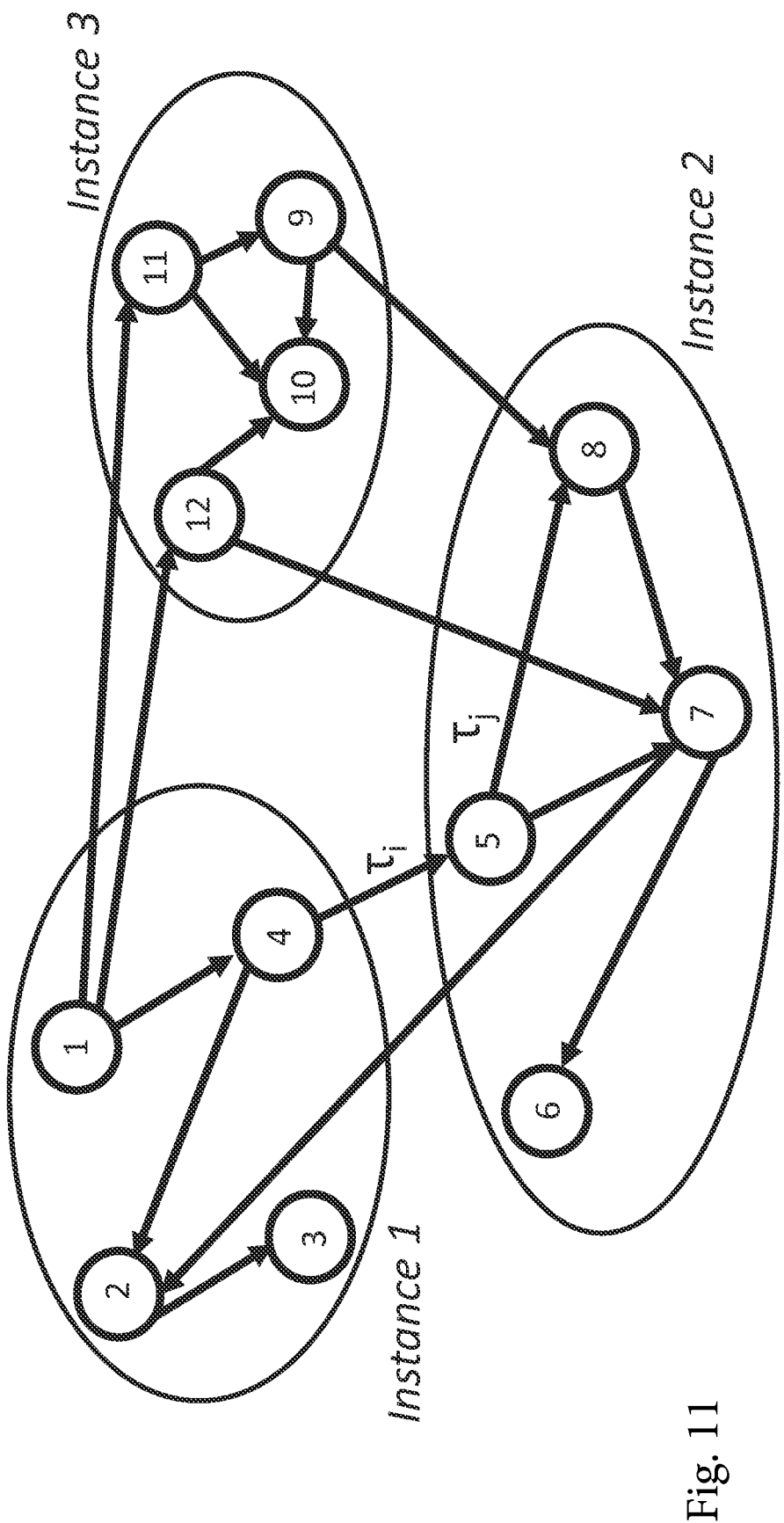
FIG. 11 shows a graph being partitioned over its nodes.

In our method we use an in-memory data-processing framework which sits on top of a filesystem, such as HDFS or AWS S3. Such a framework is suited to either batch or online processing as it allows data to be transparently stored in memory and persist it to disc only if needed. Relative to many current parallelization approaches, such as MapReduce, the amount of I/O is significantly decreased (Chattopadhyay, et al., 2012). By fully using the clusters-memory, disk synchronization is reduced and the speed of the execution is increased. The anticipated number of messages per day for the LOB data set is up to approximately one hundred billion. In-memory processing allows the message passing algorithm to be applied to this data set in a relevant amount of time. Our method supports distribution of the graph across a range of multi-core instances. An example of such partitioning is shown in FIG. 11. As an example of a supported instance type, as of April 2014, AWS supports instances with 32 cores and 244 GB of RAM. The method begins by applying an automated partitioning algorithm to the factor graph. This algorithm is designed to allocate data based on multiple factors; Firstly, the size of the RAM available. For example, a 244 GB instance will have up to 244 GB of LOB data allocated to it. The modulus after division of data will be allocated to an instance closest to that size in order to minimize running costs. Secondly, partitioning is by asset class, as LOBs within the same asset class are expected to communicate more messages than those In different asset classes. Thirdly, partitioning is by exchange, as LOBs on the same exchange are expected to communicate more messages with each other than those on different exchanges. The factor graph partition algorithm gives performance which significantly outperforms a random allocation approach. It is also noted that distributed message passing may additionally be implemented on Graphics Processing Units (GPUs) in order to increase speed (Morik & Piatkwski, 2012). Many cloud platforms, for example AWS, now offer GPU instances. Such an implementation is possible with minor changes to the current implementation.

The next key differentiator of our method is the message scheduling algorithm. Message schedule is a key part of parallelizing and distributing message passing on graphs. Scheduling is dependant on variables such as data size, hardware and even parameters. In this method we present a bespoke scheduling algorithm for applying message passing on the LOB data in a cloud setting. Variables are grouped together, allowing groups of messages to be sent across system boundaries in a ordered manner. This means the factors know which model parameter messages get updated.

Figure 12:
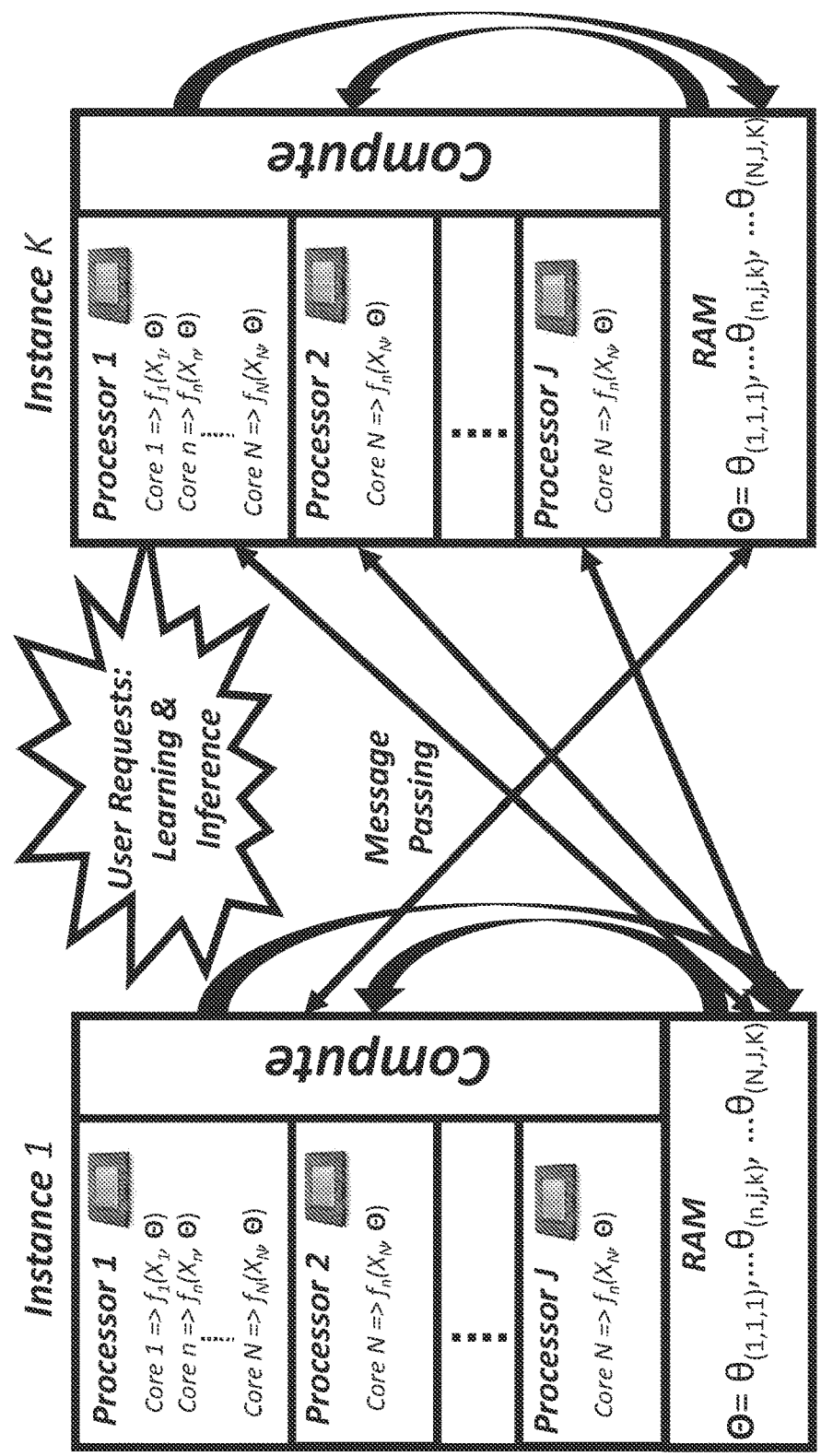
FIG. 12 depicts message passing in a distributed graphical model.

It also means that the parameters know which factors need a message update. FIG. 12 shows message passing, with messages being grouped over N cores in J processors In K instances, $$\prod_i P(y_i \mid x_i, \theta) \prod_j P(\theta_j) = \quad (1)$$

$$\ldots \prod_{n=1}^{N} \prod_{j=1}^{J_n} \prod_{k=1}^{K_j} P(y_{n,j,k} \mid \theta, x_{n,j,k}) \prod_{n=1}^{N} \prod_{i=1}^{J_n} \prod_{k=1}^{K_j} P(\theta_{n,j,k})$$

Inter-instance communication is the major overhead when running distributed machine learning algorithms. Our aim is to minimize the number of inter-instance messages. An example of the scheme being applied in a distributed setting is shown in FIG. 12. In order to further minimize the inter-instance latency, instances are specified to be physically located next to each other, for example in the same rack. For example, on the AWS cloud this is possible through the enhanced networking option.

User Applications

The set, or subset, of processed LOBs can be represented as a graph. By estimating the inter-LOB latencies a temporal index can be constructed where the data is aligned in time. FIG. 7 shows an example network consisting of four LOBs, each connected by a known latency between each exchange co-location facility. In one incarnation of the method, information flows between LOBs, as the result of an order entering one of the LOBs. For example, an event happens in one LOB and at or after the aligned time stamp an order enters a connected LOB. An economic explanation of such activity might be hedging, arbitrage or speculation by participants in response to market events. Many latent variables for the system can be hypothesized. These include, but are not limited to; measures of order imbalance inside a LOB or across a set of LOB; momentum caused by recent large trades on one side of the LOB; buying or selling pressures; sentiment. Variables which could be estimated as a result include but are not limited to; the probability of information emission from a node; probability of a change in price or volume at a node given information emission at another node; the marginal probability of a node existing in a given state; the predicted future state of a node conditional on current observations. In a second incarnation of the method, information extrinsic to the set of LOBs enters the system at, or after, a known time. An example of such information is macroeconomic data. In this setting the macroeconomic data generation locations act as nodes on the graph with directional edges to the LOB nodes. For example, the information resulting from the US Treasury auction platform TAAPS reaching the LOBs of ICAP BrokerTec and CME Globex treasury derivatives. In all incarnations of the method a replay functionality allows messages to be passed around the graph, to simulate historical events. The set, or subset, of the LOB data requested by the sub-user to be loaded is problem specific. A sub-user may wish to load all LOB data available, representing all the liquid securities globally. Or may wish to load a specific subset they are interested in. For example, a sub-user who trades FX may wish to load G10 LOBs from CME Globex and ICE exchanges (futures and options) and from spot platforms (ICAP EBS, Hotspot, FxAll e.t.c.). Additionally they may wish to load their own proprietary and private customer order-flow data from a platform they operate. In a second example, a Eurodollar futures trader on CME Globex may wish to load all outright and strategy contracts for a given day, a total of several hundred LOBs.

Let us now give some examples of how the platform may be used. In a first example, the presence of a negative price cycle in certain representations of the LOB graph represents an arbitrage opportunity. By using a cycle detection algorithm a speculator could generate a strategy which exploited this $P(G_{i+1} \mid G_i)$ (Cherkassky & Goldberg, 1999). In a second example, inference algorithms on the graph could be used to generate marginal probabilities of an LOB at a given point in time. A participant could use these probabilities to predict trade causing orders entering a given LOB given the state of the graph. In a third example, pattern recognition approaches, for example such as those suggested in (Stem et al., 2008), could be used to assign IDs to the owners of individual orders using the methods enabled by this module. The viability is such an approach is supported by analysis showing that of the 42,000 IDs trading the e-mini S&P500 future on CME Globex, only eight IDs account for nearly 50% of the total trading volume (Clark-Joseph, 2013). In a fourth example, message passing can be applied to pattern recognition in a single LOB. One possible way in which this can be applied is to consider a graphical representation of an individual LOB, allowing for predictive algorithms to be implemented (Cont at al., 2010). In a fifth example, the state of the graph can be modelled as a first-order Markov process, allowing the future state of the graph to be predicted, (Stem et al., 2004). In a final example, a financial regulator may wish to inspect the consequences of certain orders being placed. This could be achieved by inspecting marginals at or after the point of order submission.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A distributed data analysis system that analyzes Limit Order Book (LOB) data, said system including:
   a processor system having at least one processor and a memory system;
   a virtual machine interface module that allocates, by the processor system, cloud resources for at least one virtual machine, the virtual machine interface module creates, by the processor system, the at least one virtual machine, wherein the at least one virtual machine is configured to allocate cloud resources for at least one compute unit, wherein the at least one virtual machine creates, by the system, the at least one compute unit, and the at least one computer unit processes the LOB data, the at least one compute unit and the LOB data being collocated in the system;
   an update module that updates, by the system, LOB data from at least one electronic trading venue;
   a monitoring module that tracks, by the system, activity of at least one user on the system, and;
   a software library having at least one algorithm for processing and/or analyzing the LOB data;
wherein the system is implemented in a cloud computing environment;

wherein computing resources are allocated to at least one user according to the requirements of the at least one user; and wherein an instance of LOB analysis algorithm runs collocated in the cloud with the LOB data, the LOB analysis algorithm preforms a regression analysis, filters LOB data, or searches for at least patterns or correlations.

2. The system according to claim 1, wherein: the LOB data are processed to have a common format.

3. The system according to claim 1, wherein: each of at least one user of the system comprises at least one sub-user.

4. The system according to claim 1, wherein: each of at least one sub-user is allocated a sub-user-specific file area on a user-specific filesystem.

5. The system according to claim 4, wherein: each user-specific filesystem is sized dynamically.

6. The system according to claim 4, wherein: each sub-user-specific file area is sized dynamically.

7. The system according to claim 6, wherein: each sub-user specific file area is mapped to a computer belonging to the sub-user.

8. The system according to claim 1, wherein: the at least one compute unit is a virtual machine unit.

9. The system according to claim 1, wherein: the system further includes an update module for online or batch updating the LOB data.

10. The system according to claim 1, wherein: the system further includes a control module that provides and option to control which LOB data each user may access and/or process.

11. The system according to claim 1, wherein: the system further includes a download control module that provides an administrative-option to control which data each user may download from the system.

12. The system according to claim 1, wherein: the LOB data is assembled from a plurality of electronic trading venues.

13. The system according to claim 1, wherein: the system further includes a connection module for allowing a plurality of users to connect to the system.

14. The system according to claim 1, wherein: the monitoring module further implements a logging method to log at least one sub-user's activity on the system.

15. The system according to claim 1, wherein: the monitoring module further implements a billing method to generate billing data for at least one user.

16. The system according to claim 1, wherein: the monitoring module further implements an audit method to audit at least one user.

17. The system according to claim 1, wherein: the at least one algorithm is a pattern recognition algorithm that is deployed in the cloud having different instances with different locations, the locations of the instances being based on locations of the LOB data being searched for patterns.

18. The system according to claim 1, wherein:
the monitoring module utilizes user data based on the resources used by the user and/or data accessed by the user.

19. The system according to claim 1, wherein: the cloud computing environment is a public cloud computing environment.

20. The system according to claim 1, wherein: the control module is downloadable and allows control over which data each user has permission to download from the system.

21. The system according to claim 20, wherein: the LOB analysis algorithm searches for the patterns via an instance of a pattern recognition algorithm running on the same rack in the cloud with the LOB data being searched for patterns.

22. A distributed data analysis method, for use in analyzing Limit Order Book (LOB) data, comprising:
allocating, cloud resources for at least one virtual machine, via a virtual machine interface of a system, the system having at least a machine having at least one processor and memory, creating, by the at least one virtual machine interface at least one virtual machine, allocating, via the at least one virtual machine, cloud resources for at least one compute unit, creating via the at least one virtual machine at least one compute unit, wherein the at least one compute unit and the LOB data are collocated, and processing, via the at least one compute unit the LOB data;

updating, via an update module of the system, the LOB data from at least one electronic trading venue, and;

monitoring, via a monitoring module of the system, activity of at least one user on the system, and;

the memory storing a software library having at least one algorithm, which when implemented, the at least one algorithm processes and/or analyzes the LOB data;

implementing the system in a cloud computing environment; and allocating computing resources to at least one user according to the requirements of the at least one user;

wherein an instance of LOB analysis algorithm runs collocated in the cloud with the LOB data, the LOB analysis algorithm at least preforms a regression analysis, filters LOB data, or searches for at least patterns or correlations.

23. A distributed data analysis system configured to analyze Limit Order Book (LOB) data, said system comprising:
one or more machines, each machine including at least one or more processors; and memory storing one or more machine instructions, which when implemented, cause the one or more machines to implement, via the one or more processors, a method including at least allocating, cloud resources for at least one virtual machine, via a virtual machine interface of the system, at least one virtual machine, creating, via the at least one virtual machine, at least one compute unit, wherein the at least one compute unit and the LOB data are collocated within the system, and processing, via the at least one compute unit, the LOB data;

updating, via an update module of the system, the LOB data from at least one electronic trading venue, and;

tracking, via a monitoring module of the system, activity of at least one user on the system, and;

the memory storing a software library having at least one algorithm, which when implemented, the at least one algorithm processes and/or analyzes the LOB data;

allocating computing resources to the at least one user according to the requirements of the at least one user; and implementing the system in a cloud computing environment;

wherein an instance of LOB analysis algorithm runs collocated in the cloud with the LOB data, the at least one algorithm that processes and/or analyzes the LOB data at least preforms a regression analysis, filters LOB data, or searches for at least patterns or correlations.

24. The system according to claim 23, wherein: the at least one algorithm is a pattern recognition algorithm, wherein when the at least one algorithm is implemented, the at least one algorithm searches patterns within one LOB and patterns found based on more than one LOB.

25. The system according to claim 23, the LOB data being historical data.

26. The system according to claim 23, the method further including simulating market behavior based on message passing associated with LOB data.

27. The system according to claim 23, the method further including simulating latencies of messages passing between LOBs.

\* \* \* \* \*